US008744454B2

(12) United States Patent
Wu

(10) Patent No.: US 8,744,454 B2
(45) Date of Patent: Jun. 3, 2014

(54) ENABLING AN ASSISTED DIALING ON A MOBILE DEVICE

(75) Inventor: Eric Wu, Denville, NJ (US)

(73) Assignee: Cellco Partnership, Basking Ridge, NJ (US)

( * ) Notice: Subject to any disclaimer, the term of this patent is extended or adjusted under 35 U.S.C. 154(b) by 369 days.

(21) Appl. No.: 12/562,680

(22) Filed: Sep. 18, 2009

(65) Prior Publication Data
US 2011/0070890 A1   Mar. 24, 2011

(51) Int. Cl.
*H04W 40/00* (2009.01)

(52) U.S. Cl.
USPC ............. 455/445; 370/338; 370/395.31

(58) Field of Classification Search
CPC ....... H04W 92/02; H04W 8/26; H04W 76/02; H04M 3/44; H04M 3/424
USPC ............. 455/445, 558, 564; 370/338
See application file for complete search history.

(56) References Cited

U.S. PATENT DOCUMENTS

| | | | |
|---|---|---|---|
| 2002/0160815 A1* | 10/2002 | Patel et al. | 455/564 |
| 2006/0177043 A1* | 8/2006 | Li et al. | 379/355.08 |
| 2008/0167083 A1 | 7/2008 | Wyld et al. | |
| 2009/0124291 A1* | 5/2009 | Cha | 455/564 |
| 2009/0149220 A1 | 6/2009 | Camilleri et al. | |

FOREIGN PATENT DOCUMENTS

| | | | | |
|---|---|---|---|---|
| EP | 1742493 A1 * | 1/2007 | ............... | H04Q 3/42 |
| WO | 2006/065856 | 6/2006 | | |

OTHER PUBLICATIONS

"Telephone numbers in Europe," Sep. 22, 2010 <http://en.wikipedia.org/wiki/Telephone_numbers_in_Europe>.
"List of country calling codes," Sep. 22, 2010 <http://en.wikipedia.org/wiki/List_of_country_calling_codes>.
"Telephone numbering plan" Sep. 22, 2010 <http://en.wikipedia.org/wiki/Telephone_numbering_plan>.
"List of international call prefixes," Sep. 22, 2010 <http://en.wikipedia.org/wiki/List_of_international_call_prefixes>.
Complete Application history of U.S. Appl. No. 12/889,093, filed Sep. 23, 2010 entitled Automating Emergency Calls Globally.
Complete Application history of U.S. Appl. No. 12/889,076, filed Sep. 23, 2010 entitled Assisting a User to Store and Place a Call Back to Received International Number.
Complete Application history of U.S. Appl. No. 12/636,240, filed Dec. 11, 2009 entitled Determining Mobile Station Operating Country to Enable System Selection or Other Location Based Device Features Without Network Assistance.

* cited by examiner

*Primary Examiner* — Marcos Batista

(57) ABSTRACT

The instant application describes a method for enabling an assisted dialing on a mobile device. The method includes steps of receiving, at a mobile device, a number; automatically identifying a reference country and one or more parameters associated with the reference country; and automatically determining whether the received number should be modified based on the one or more parameters associated with the reference country. The method also includes steps of automatically modifying the received number upon determining that the received number should be modified; and transmitting the modified number to a wireless network servicing the mobile device.

23 Claims, 20 Drawing Sheets

200A

CDNA Network
Dialing U.S. numbers or other NANP numbers

| Format | Dialed Number | Action |
|---|---|---|
| 1. | 7 Digits – 7 Digit Phone Number | • Don't modify number<br>• Dial number as entered |
| 2. | 10 Digits – Three Digit Area Codes Followed by Seven Digits Phone Number | • Don't modify number<br>• Dial number as entered |
| 3. | 11 Digits – One Digit U.S. National Direct Dial Prefix '1,' Followed by Three Digit Area Code + Seven Digit Phone Numbers | • Don't modify number<br>• Dial number as entered |
| 4. | "+" and 11 Digits - + Followed by U.S. NDD Prefix 1 Followed by Three Digit Area Code + Seven Digit Phone Number | • Dial the number without "+" |

Fig. 2A

| Format | User Enters | Device Dials |
|---|---|---|
| 1. | 7654321 | 7654321 network may prompt user for area code |
| 2. | 9087654321 | 9087654321 |
| 3. | 19087654321 | 19087654321 |
| 4. | +19087654321 | 19087654321 |

In VZW CDNA Network
Dialing International Number

| Format | Dialed Number | Action |
|---|---|---|
| 1. | 3 Digit U.S. ID.D Prefix, Country Code, Area Code, and Phone Number | • Don't modify number<br>• Dial number as entered |
| 2. | +, Country Code, Area Code, and Phone Number | • Replace + with U.S. IDD prefix<br>• Dial the remaining numbers as entered |
| 3. | Country Code, Area/City Code and Phone Number | • If the entered number is greater than 11 assume, it is international<br>• Dial 011 followed by the number entered |

Fig. 3A

A device in U.S. is trying to reach U.K. number

| Format | Dialed Number | Action |
|---|---|---|
| 1. | 011449876543211 | 011449876543211 |
| 2. | +449876543211 | 011449876543211 |
| 3. | 449876543211 | 011449876543211 |

Fig. 3B

GSM/UMTS Network
Dialing Local Numbers

400A

| Format | Dialed Number | Action |
|---|---|---|
| 1. | +, Local Country Code, Area Code, and Phone Number | • Don't modify number<br>• Dial number as entered |
| 2. | Local IDD Prefix, Local Country Code, Area/City Code, Phone Number | • Don't modify number<br>• Dial number as entered |
| 3. | NDD prefix, Area/City Code, Phone Number | • Don't modify number<br>• Dial number as entered |
| 4. | Assisted Dialing of Local Numbers in GSM/UMTS Network | • Replace the reference Country IDD prefix with + |

Fig. 4A

A device in U.K. GSM/UMTS network is trying to reach a U.K. Number

| Format | User Enters | Device Dials |
|---|---|---|
| 1. | +449876543211 | +449876543211 |
| 2. | 00449876543211 | 00449876543211 |
| 3. | 098765 43211 | 098765 43211 |
| 4. with assisted dialing | 011449876211 | +44987 6211 (with assisted dialing) |
| 5. without assisted dialing | 011449876211 | 011449876211 (without assisted dialing) |

Fig. 4B

In GSM/UMTS Network
Dialing International Number

500A

| Format | Dialed Number | Action |
|---|---|---|
| 1. | +, Country Code, Area/City Code, Phone Number | • Don't modify number<br>• Dial number as entered |
| 2. | Local IDD prefix, Country Code, Area/City Code, Phone Number | • Don't modify number<br>• Dial number as is. Alternately, replace IDD prefix with + and send as in format 1 |
| 3. | Assisted Dialing of International Numbers in GSM/UMTS Network | • Replace the Reference Country IDD prefix with + |

Fig. 5A

A device in a U.K. GSM/UMTS network is trying to reach a U.S. Number

| Format | User Enters | Device Dials |
|---|---|---|
| 1. | +19087654321 | +19087654321 |
| 2. | 0019087654321 | 0019087654321 or +19087654321 |
| 3. with assisted dialing | 01119087654321 | +19087654321 (with assisted dialing) |
| 4. without assisted dialing | 01119087654321 | 01119087654321 (without assisted dialing) |

| Format | Dialed Number | Action |
|---|---|---|
| 1. | +, U.S. Country Code, Area/City Code, Phone Number | • Don't modify number<br>• Dial number as entered |
| 2. | Local IDD Prefix, U.S. Country Code, Area/City Code, Phone Number | • Don't modify number<br>• Dial number as entered. |
| 3. | Assisted Dialing of U.S. or Other NANP Numbers in GSM/UMTS Network | • Modify any number sequence that begins with the Reference Country IDD prefix + replace it with '+' |

Fig. 6A

A device in a U.K. GSM/UMTS network is trying to reach a U.S. Number 908-765-4321

| Format | Dialed Number | Action |
|---|---|---|
| 1. | +19087654321 | +19087654321 |
| 2. | 0019087654321 | 0019087654321 or +19087654321 |
| 3. with assisted dialing | 01119087654321 | +19087654321 (with assisted dialing) |
| 4. without assisted dialing | 01119087654321 | 01119087654321 (without assisted dialing) |

Fig. 6B

In International CDMA
Dialing Local Numbers

700A

| Format | Dialed Number | Action |
|---|---|---|
| 1. | +, Local Country Code, Area/City Code, Phone Number | • Replace + and Country Code with NDD prefix.<br>• Dial the number as NDD prefix followed by Area/City code + phone number |
| 2. | Local IDD prefix, Local Country Code, Area/City Code, Phone Number | • OTA IDD + OTA Country Code shall be compared with the numbers entered to determine if the entered number is local. If so, replace IDD prefix + local country code with NDD prefix and the number. |
| 3. | NDD Prefix, Area/City Code, Phone Number | • Don't Modify.<br>• Dial number as it is. |
| 4. | Assisted Dialing of Local Numbers in International CDMA | • Modify any number sequence that begins with the Reference Country IDD prefix by explaining with OTA IDD prefix |

Fig. 7A

A device in a China CDMA network trying to reach a number in China

| Format | Dialed Number | Action |
|---|---|---|
| 1. | +861030123456 | 01030123456 |
| 2. | 00861030123456 | 01030123456 |
| 3. with assisted dialing | 01030123456 | 01030123456 |
| 4. without assisted dialing | 0118601030123456 | 0118601030123456 |

Fig. 7B

In International CDMA
Dialing International Numbers

800A

| Format | Dialed Number | Action |
|---|---|---|
| 1. | + Country Code, Area/City Code, Phone Number | • Determine the appropriate OTA IDD prefix<br>• Replace '+' with the OTA prefix<br>• Dial the number as modified |
| 2. | IDD Prefix, Country Code, Area/City Code, Phone Number | • Confirm that the IDD prefix = the OTA IDD prefix<br>• Confirm that the country code ≠ the OTA country prefix<br>• Dial the number upon confirmation |
| 3. | Assisted Dialing of International Numbers in International CDMA | • Replace reference country prefix ID with OTA IDD prefix<br>• Dial the number |

Fig. 8A

A device in a China network is trying to reach a U.K. number 449876543211.
Reference country set to U.S.

| Format | Dialed Number | Action |
|---|---|---|
| 1. | +44876543211 | 00449876543211 |
| 2. | 00449876543211 | 00449876543211 |
| 3. with assisted dialing | 011449876543211 | 00449876543211 (with assisted dialing) |
| 4. without assisted dialing | 011449876543211 | 011449876543211 (without assisted dialing) |

International CDMA
Dialing U.S. Numbers or other NANP Numbers

| Format | Dialed Number | Action |
|---|---|---|
| 1. | + Country Code, Area Code, Phone Number | <ul><li>Determine the appropriate OTA IDD prefix</li><li>Replace '+' with the OTA prefix</li><li>Dial the number</li></ul> |
| 2. | IDD prefix, Country Code, Area/City Code, Phone Number | <ul><li>Confirm that the IDD prefix = OTA IDD prefix</li><li>If so, don't modify</li></ul> |

Fig. 9A

A device in China CDMA Network trying to reach U.S.

| Format | Dialed Number | Dial |
|---|---|---|
| 1. | +19087654321 | 0019087654321 |
| 2. | 0019087654321 | 0019087654321 |

CDNA Network
Dialing U.S. numbers or other NANP numbers

| Format | Dialed Number | Action |
|---|---|---|
| 1. | 7 digits – 7 Digit Phone Number | • Don't modify number<br>• Dial number as entered |
| 2. | 10 Digits – Three Digit Area Codes Followed by Seven Digits Phone Number | • Don't modify number<br>• Dial number as entered |
| 3. | 11 Digits – One Digit U.S. National Direct Dial Prefix '1,' Followed by Three Digit Area Code + Seven Digit Phone Numbers | • Don't modify number<br>• Dial number as entered |
| 4. | "+" and 11 Digits - + Followed by U.S. NDD Prefix 1 Followed by Three Digit Area Code + Seven Digit Phone Number | • Dial the number without "+" |

Fig. 10A

A Device in U.S. is trying to reach U.S. number 908-765-4321

| Format | User Enters | Device Dials |
|---|---|---|
| 1. | 7654321 | 7654321 network may prompt user for area code |
| 2. | 9087654321 | 9087654321 |
| 3. | 19087654321 | 19087654321 |
| 4. | +19087654321 | 19087654321 |

In VZW CDNA Network
Dialing International Number

| Format | Dialed Number | Action |
|---|---|---|
| 1. | 3 Digit U.S. IDD Prefix, Country Code, Area Code, and Phone Number | • Don't modify number<br>• Dial number as entered |
| 2. | +, Country Code, Area Code, and Phone Number | • Replace + with U.S. IDD prefix<br>• Dial the remaining numbers as entered |
| 3. | Country Code, Area/City Code and Phone Number | • If the entered number is greater than 4 assume, it is international<br>• Dial 011 followed by the number entered |
| 4. | Non US IDD, Country Code, Area/City Code, Phone Number | • Replace the non US IDD prefix with US IDD prefix + dial the remaining numbers as entered. |

Fig. 11A

A device in U.S. is trying to reach U.K. number

| Format | Dialed Number | Action |
|---|---|---|
| 1. | 011449876543211 | 011449876543211 |
| 2. | +449876543211 | 011449876543211 |
| 3. | 449876543211 | 011449876543211 |
| 4. | 0044987654321 (user usually calls from country whose IDD prefix is 0) | 011449876543211 |

Fig. 11B

Assisted Dialing from GSM Network Example

Dialing US numbers from a UK GSM Network

1200A

| Example Numbers | International Number Format | Country Code | Area Code/City Code | Number |
|---|---|---|---|---|
| U.S. | 19081234567 | 1 | 908 | 1234567 |

| References | |
|---|---|
| Country Code | U.S. |
| IDD Prefix | 1 |
| NDD Prefix | 011 |
| Area/City Code | 1 |
| National Number Length | 908 |
| | 10 |

| U.S. Number Formats | Stored Number: | Reference Country: US Device Dials | Dialing Method | Reference Country: China Device Dials. | Dialing Method | Reference Country: U.K. Device Dials | Dialing Method |
|---|---|---|---|---|---|---|---|
| '+' code, U.S. country code, area code, phone number | +19081234567 | +19081234567 | 2.2(A)(1) | +19081234567 | 2.2(A)(1) | +19081234567 | 2.2(A)(1) |
| U.K. IDD with U.S. country code, area code, phone number (user has stored this U.S. number as if dialing in U.K.) | 0019081234567 | 0019081234567 | Dialed As Is | +19081234567 | 2.2(A)(2) | +19081234567 | 2.2(A)(2) |
| U.S number with U.S. NDD code | 19081234567 | +19081234567 | 2.2(A)(3) | 19081234567 | Dialed As Is (not dialed properly) | 19081234567 | Dialed As Is (not dialed property) |
| U.S. number without U.S. NDD code | 9081234567 | +19081234567 | 2.2(A)(4) | 9081234567 | Dialed As Is (not dialed property) | 9081234567 | Dialed As Is (not dialed property) |
| U.S. number without both NDD code and area code | 1234567 | +19081234567 | 2.2(A)(5) | 1234567 | Dialed As Is (not dialed property) | 1234567 | Dialed As Is (not dialed property) |

FIG. 12A

Assisted Dialing from GSM Network Example  1200B
Dialing Chinese numbers from a UK GSM Network

| Example Numbers | International Number Format | Country Code | Area Code/City Code | Number |
|---|---|---|---|---|
| China | 861030123456 | 86 | 10 | 3012456 |

| References | |
|---|---|
| Country Code | China |
| IDD Prefix | 00 |
| NDD Prefix | 0 |
| Area/City Code | 10 |
| National Number Length | 10 |

| Chinese Number Formats | Stored Number: | Reference Country: US Device Dials | Dialing Method | Reference Country: China Device Dials. | Dialing Method | Reference Country: U.K. Device Dials | Dialing Method |
|---|---|---|---|---|---|---|---|
| '+' code, China country code, area code, phone number | +861030123456 | +861030123456 | 2.2(A)(1) | +861030123456 | 2.2(A)(1) | +861030123456 | 2.2(A)(1) |
| U.S. IDD with China country code, area code, phone number (user has stored this number as if dialing from U.S.) | 011861030123456 | +861030123456 | 2.2(A)(2) | 011861030123456 | Dialed As Is (not dialed Properly) | 011861030123456 | Dialed As Is (not dialed property) |
| U.K. IDD with China country code, area code, phone number (user has stored this number as if dialing from U.K.) | 00861030123456 | 00861030123456 | Dialed As Is | 00861030123456 | Dialed As Is | +861030123456 | 2.2(A)(2) |
| Number in China with China NDD (user has stored this number as if dialing from China) | 01030123456 | 01030123456 | Dialed As Is (not dialed Property) | +861030123456 | 2.2(A)(3) | +441030123456 | 2.2(A)(3) |

FIG. 12B

Assisted Dialing from GSM Network Example 1200C
Dialing UK Numbers from UK GSM Network

| Example Numbers | International Number Format | Country Code | Area Code/City Code | Number |
|---|---|---|---|---|
| U.K. | 449876543211 | 44 | 9876 | 543211 |

| References | |
|---|---|
| Country Code | U.K. |
| IDD Prefix | 00 |
| NDD Prefix | 0 |
| Area/City Code | 9876 |
| National Number Length | 10 |

| U.K. Number Formats | Stored Number: | Reference Country: US Device Dials | Dialing Method | Reference Country: China Device Dials. | Dialing Method | Reference Country: U.K. Device Dials | Dialing Method |
|---|---|---|---|---|---|---|---|
| '+' code, U.K. country code, area code, phone number | +449876543211 | +449876543211 | 2.2(A)(1) | +449876543211 | 2.2(A)(1) | +449876543211 | 2.2(A)(1) |
| U.S. IDD with U.K. country code, area code, phone number (user has stored this number as if dialing in U.S.) | 011449876543211 | +449876543211 | 2.2(A)(2) | 011449876543211 | Dialed As Is (not dialed Property) | 011449876543211 | Dialed As Is (not dialed property) |
| China IDD with U.K. country code, area code, phone number (user has stored this number as if dialing from China) | 0044987654321 | 0044987654321 | Dialed As Is | +449876543211 | 2.2(A)(2) | +449876543211 | 2.2(A)(2) |
| Number in U.K. with U.K. NDD (user has stored this number as if dialing from U.K.) | 09876543211 | 09876543211 | Dialed As Is (not dialed Property) | +869876543211 | 2.2(A)(3) | +449876543211 | 2.2(A)(3) |

FIG. 12C

Assisted Dialing from CDMA Network Example  1300A
Dialing US numbers from China CDMA Network

| Example Numbers | International Number Format | Country Code | Area Code/City Code | Number |
|---|---|---|---|---|
| U.S. | 19081234567 | 1 | 908 | 1234567 |

| References | |
|---|---|
| Country Code | U.S. |
| IDD Prefix | 1 |
| NDD Prefix | 011 |
| Area/City Code | 1 |
| National Number Length | 908 |
| | 10 |

| U.S. Number Formats | Stored Number: | Reference Country: US Device Dials | Dialing Method | Reference Country: China Device Dials. | Dialing Method | Reference Country: U.K. Device Dials | Dialing Method |
|---|---|---|---|---|---|---|---|
| '+' code, U.S. country code, area code, phone number | +19081234567 | 00190812345567 | 2.3(A)(1)(B) | 0090081234567 | 2.3(A)(1)(B) | 0019081234567 | 2.3(A)(1)(B) |
| U.K. IDD with U.S. country code, area code, phone number (user has stored this U.S. number as if dialing in U.K.) | 0019081234567 | 00190812345567 | 2.3(A)(2)(B)(ii) | 00190812345567 | 2.3(A)(2)(B)(ii) | 00190812345567 | 2.3(A)(2)(B)(ii) |
| U.S number with U.S. NDD code | 19081234567 | 00190812345567 | 2.3(A)(3)(B) | 19081234567 | Dialed As Is (not dialed properly) | 19081234567 | Dialed As Is (not dialed properly) |
| U.S. number without U.S. NDD code | 9081234567 | 00190812345567 | 2.2(A)(4) | 9081234567 | Dialed As Is (not dialed properly) | 004490812345 67 | 2.3(A)(4) |
| U.S. number without both NDD code and area code | 1234567 | 00190812345567 | 2.2(A)(5) | 1234567 | Dialed As Is (not dialed properly) | 1234567 | Dialed As Is (not dialed properly) |

FIG. 13A

Assisted Dialing from CDMA Network Example  1300B
Dialing Chinese numbers from China CDMA Network

| Example Numbers | International Number Format | Country Code | Area Code/City Code | Number |
|---|---|---|---|---|
| China | 861030123456 | 86 | 10 | 30123456 |

| References | |
|---|---|
| Country Code | China |
| IDD Prefix | 86 |
| NDD Prefix | 00 |
| Area/City Code | 0 |
| National Number Length | 10 |
| | 10 |

| Chinese Number Formats | Stored Number: | Reference Country: US Device Dials | Dialing Method | Reference Country: China Device Dials. | Dialing Method | Reference Country: U.K. Device Dials | Dialing Method |
|---|---|---|---|---|---|---|---|
| '+' code, China country code, area code, phone number | +861030123456 | 01030123456 | 2.3(A)(1)(A) | 01030123456 | 2.3(A)(1)(A) | 01030123456 | 2.3(A)(1)(A) |
| U.S. IDD with China country code, area code, phone number (user has stored this number as if dialing from U.S.) | 0118610301234 56 | 01030123456 | 2.3(A)(2)(A) | 0118610301234 56 | Dialed As Is (not dialed Property) | 0118610301234 56 | Dialed As Is (not dialed property) |
| U.K. IDD with China country code, area code, phone number (user has stored this number as if dialing from U.K.) | 00861030123456 | 01030123456 | 2.3(A)(2)(A) | 01030123456 | 2.3(A)(2)(A) | 01030123456 | 2.3(A)(2)(A) |
| Number in China with China NDD (user has stored this number as if dialing from China) | 01030123456 | 001103012345 6 | 2.3(A)(3)(B) | 01030123456 | 2.2(A)(3)(A) | 004410301234 56 | 2.2(A)(3)(B) |

FIG. 13B

Assisted Dialing from CDMA Network Example  1300C
Dialing UK numbers from China CDMA Network

| Example Numbers | International Number Format | Country Code | Area Code/City Code | Number |
|---|---|---|---|---|
| U.K. | 44987654321 | 44 | 9876 | 543211 |

| References | |
|---|---|
| Country Code | U.K. |
| IDD Prefix | 44 |
| NDD Prefix | 00 |
| Area/City Code | 0 |
| National Number Length | 9876 |
|  | 10 |

| U.K. Number Formats | Stored Number: | Reference Country: US Device Dials | Dialing Method | Reference Country: China Device Dials. | Dialing Method | Reference Country: U.K. Device Dials | Dialing Method |
|---|---|---|---|---|---|---|---|
| '+' code, U.K. country code, area code, phone number | +449876543211 | 0044987654321 | 2.3(A)(1)(B) | 0044987654321 | 2.3(A)(1)(B) | 0044987654321 | 2.3(A)(1)(B) |
| U.S. IDD with U.K. country code, area code, phone number (user has stored this number as if dialing in U.S.) | 011449876543211 | 0044987654321 | 2.3(A)(2)(B)(i) | 01144987654321 1 | Dialed As Is (not dialed Property) | 01144987654321 1 | Dialed As Is (not dialed properly) |
| China IDD with U.K. country code, area code, phone number (user has stored this number as if dialing from China) | 0044987654321 1 | 0044987654321 | 2.3(A)(2)(B)(ii) | 0044987654321 | 2.3(A)(2)(B)(ii) | 0044987654321 | 2.3(A)(2)(B)(ii) |
| Number in U.K. with U.K. NDD (user has stored this number as if dialing from U.K.) | 09876543211 | 0019876543211 | 2.3(A)(3)(B) | 09876543211 | 2.3(A)(3)(A) | +449876543211 | 2.3(A)(3)(B) |

FIG. 13C

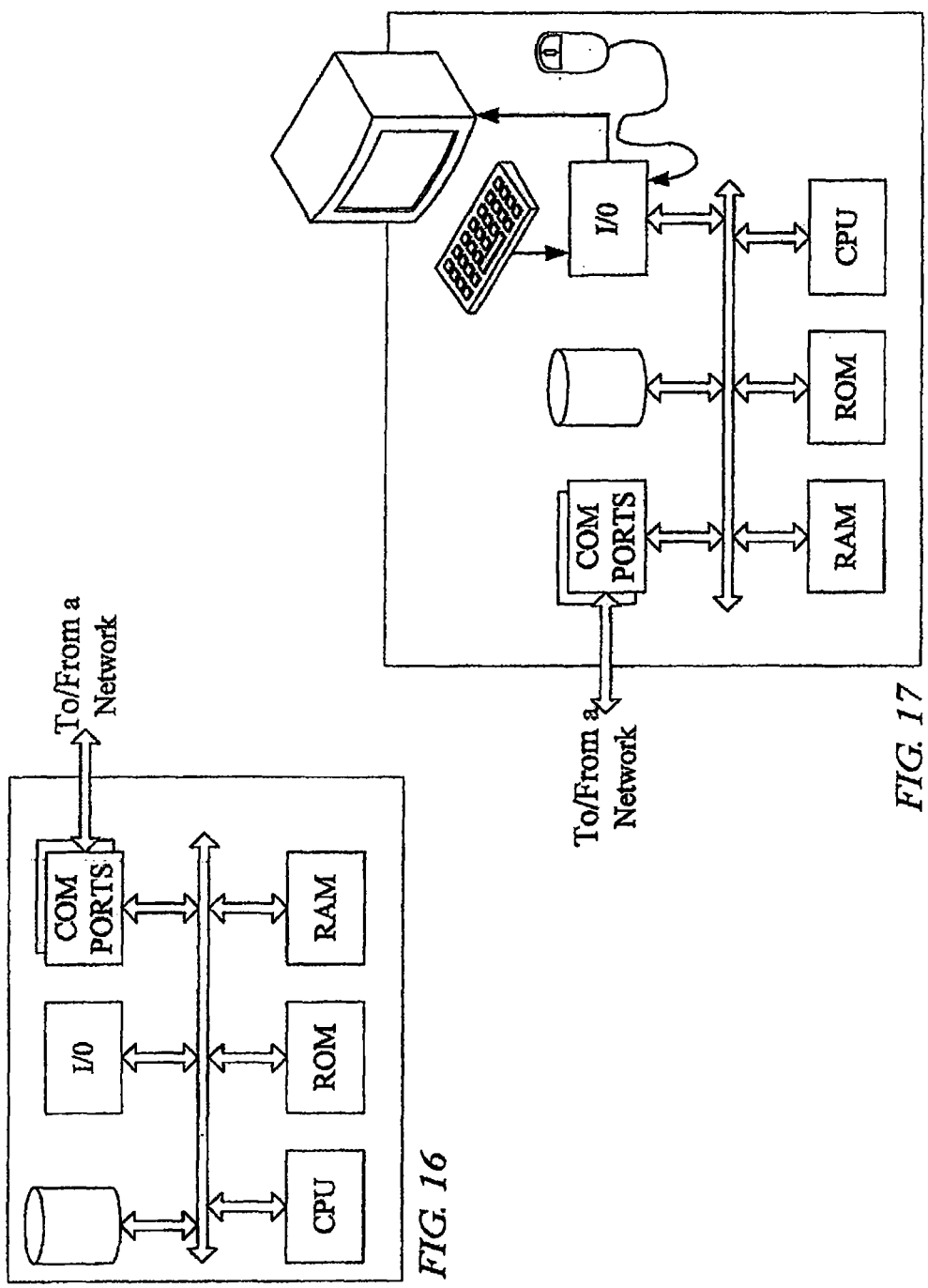

ENABLING AN ASSISTED DIALING ON A MOBILE DEVICE

TECHNICAL FIELD

The present subject matter relates to enabling an assisted dialing method on a mobile device, for example, enabling the mobile to select a proper international standard for dialing numbers both domestically and internationally.

BACKGROUND

In recent years, use of mobile communications devices for voice telephone services, email or text messaging services and even multi-media services has become commonplace, among mobile professionals and throughout the more general consumer population. Mobile service provided through public cellular or PCS (personal communication service) type networks, particularly for voice telephone service, has become virtually ubiquitous across much of the world.

A user of the mobile device usually enters a telephone number into the mobile device or retrieves a number from a contact list to reach a particular destination. The dialing patterns are country specific and apply whether the user is dialing from a mobile device or from a landline. As such, it is important for the mobile user to dial a correct dialing pattern as the mobile user roams from one country to another country.

For example, if the mobile user has its home network in United States and wishes to reach another subscriber within the same home network, the user may enter the National Direct Dial (NDD) code of the United States (e.g., 1) followed by the phone number of the other user. For another example, if the same mobile user wishes to reach another subscriber within the network of another country, the user may have to dial the International Direct Dial (IDD) code (e.g., 011) of the United States followed by the country code associated with the other user and the telephone number of the user. As such, as mobile users roam into different networks, they need to be continuously aware of the IDD code of the country in which they are located and the relevant country codes.

The rapid expansion of such mobile communication services has resulted in deployment of a variety of different and often incompatible wireless network technologies, in different jurisdictions or regions and in some cases as competing services within the same area. A large carrier may operate its network over a wide geographic area and have roaming agreements with operators of other compatible technology networks in other areas. However, occasions still arise in which a service technology of a home network service provider may not be available in a visited area or region into which a customer roams and intends to use her mobile station. To allow continued operation in regions where the local provider offers service via a different technology, station manufactures have developed dual or multi mode mobile stations, which have the capability of communicating via two or more wireless mobile technologies.

Hence, global devices that use 3GPP2 type CDMA technologies (1xRTT and EVDO) are also required to operate in networks that support 3GPP technologies (GSM/UMTS/LTE). This is necessary because in many countries around the world CDMA is not deployed. One example would be European countries where a CDMA device would have no coverage at all. In addition, there are many countries, e.g., China and India, where both 3GPP2 and 3GPP based networks exist with extensive coverage.

The variety of different wireless network technologies require a variety of different number formatting schemes for placing calls either domestically or internationally. For example, for international calls, the CDMA network requires the user to enter an IDD code or Exit code of the current country that the mobile station is operating in and the destination country code associated with the international number prior to entering the international number of the intended destination. In contrast, the GSM networks enable the user to enter a "+" rather than the IDD code to initiate an international call. In response, the GSM network assumes the correct IDD code and adds it in the relevant signaling messages if/when needed to route the call to the destination. Such systems, however, may create inconvenience for the users because the users may not be aware of international dialing standards to successfully dial numbers both domestically and internationally.

To illustrate further, even if it is assumed that the user is aware of standards applied in user's home country, the user may not be aware of the same when traveling to other countries. For example, the user may be aware that making international calls from the United States requires first dialing IDD 011, however, the same user may not be aware that to make the same international call in China, he/she has to instead dial 00 as for the IDD code. For another example, the user may even be aware of the IDD code of the foreign country in which he/she is located but may not be aware of the country code associated with the destination number. For example, the destination number may be 908-555-1212, which the user calls frequently when at home in the United States. To dial the same number from outside of the United States, the user will need not only the relevant IDD code but also the country code (e.g., '1') of the United States.

Hence there is a need for method that helps users, especially those not aware of international dialing standards, to dial numbers both domestically and internationally regardless of the wireless network or the country in which they are operating.

SUMMARY

In one general aspect, the instant application describes a method for enabling an assisted dialing on a mobile device. The method includes steps of receiving, at a mobile device, a number; automatically identifying a reference country and one or more parameters associated with the reference country; and automatically determining whether the received number should be modified based on the one or more parameters associated with the reference country. The method also includes steps of automatically modifying the received number upon determining that the received number should be modified; and transmitting the modified number to a wireless network servicing the mobile device.

The above general concept may include one or more of the following features. For example, the method may further include a step of activating an assisted dialing option. The step of activating the assisted dialing option may include displaying to the user of the mobile device the assisted dialing option; requesting the user of the mobile device to select the assisted dialing option; and receiving from the user of the mobile device an indication that the user has selected the assisted dialing option. The modified number may be associated with a text message or a voice call.

The method may further include a step of automatically activating an assisted dialing option. Receiving the number may include receiving a number from a contact list stored in the mobile device. The method may further include a step of identifying the location of the mobile device. In this scenario, determining whether the received number should be modified may include determining whether or not the received number is associated with the location of the mobile device.

Identifying the location of the mobile device may include identifying the location of the mobile device via a GPS, a signature of the wireless network, or a user input. Determining whether or not the received number is associated with the location of the mobile device may include determining the received number is not associated with the location of the mobile device. Automatically modifying the received number may include adding an International Direct Dial code of the reference country to the received number when the mobile device is operating in the reference country and the received number is not associated with the reference country. Determining the received number is not associated with the reference country may include determining the received number includes more digits than a national number length of the reference country or the received number includes a plus indicator. Automatically modifying the received number may include adding an area code to the received number.

Determining whether or not the received number is associated with the location of the mobile device may include determining the received number is not associated with the location of the mobile device; and automatically modifying the received number may include adding an International Direct Dial code of the country in which the mobile device is located when the mobile device is operating outside the reference country and the received number is not associated with the country in which the mobile device is located.

Receiving the number may include receiving the number when the mobile device is in an idle mode. Received number may not be associated with the reference country if the received number includes more digits than a national number length of the reference country or the country code of the received number is different from the country code of the reference country. Received number may not be associated with the reference country if the received number includes a plus indicator.

The method may further include a step of displaying to the user that the assisted dialing is ON. The method may further include notifying the user that the received number is being modified; and displaying to the user the modified number.

Identifying the reference country may include requesting that the user of the mobile device identifies the reference country; and receiving, in response to the requesting step, a selection from the user identifying the reference country. Identifying the reference country may include identifying the location of the mobile device; and identifying the reference country based on the location of the mobile device. One or more parameters may include national number length.

Implementations of the described techniques may include hardware, a method or process, or computer software on a computer-accessible medium.

The details of one or more implementations are set forth in the accompanying drawings and the description below. Other features will be apparent from the description and drawings, and from the claims.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2A illustrates an exemplary table that shows the action the mobile device will take upon receiving U.S. telephone numbers or other North American Number Plan (NANP) numbers while operating in a reference country.

FIG. 2B illustrates generation/modification of a particular U.S. number for each of the scenarios shown in FIG. 2A.

FIG. 3A illustrates an exemplary table showing the action the mobile device will take upon receiving an international number while operating in the reference country.

FIG. 3B illustrates generation/modification of a particular international number for each of the assisted dialing scenarios shown in FIG. 3A.

FIG. 4A illustrates an exemplary table showing the action the mobile device takes upon receiving local numbers in a GSM/UMTS network of a country different than the reference country.

FIG. 4B illustrates generation/modification of a particular local number for each of the assisted dialing scenarios shown in FIG. 4A.

FIG. 5A illustrates an exemplary table showing the action the mobile device takes upon receiving international numbers while operating in a GSM/UMTS network of a country different than the reference country.

FIG. 5B illustrates generation/modification of a particular international number for each of the assisted dialing scenarios shown in FIG. 5A.

FIG. 6A illustrates an exemplary table showing the action the mobile device takes upon receiving U.S. numbers while operating in a GSM/UMTS network of a country different from the reference country.

FIG. 6B illustrates generation/modification of a particular U.S. number for each of the assisted dialing scenarios shown in FIG. 6A.

FIG. 7A illustrates an exemplary table showing the action the mobile device takes upon receiving local numbers while operating in a CDMA network of a country other than the reference country.

FIG. 7B illustrates generation/modification of a particular local number for each of the assisted dialing scenarios shown in FIG. 7A.

FIG. 8A illustrates an exemplary table showing the action the mobile device takes upon receiving international numbers while roaming in a CDMA network of a country other than the reference country.

FIG. 8B illustrates generation/modification of a particular international number for each of the assisted dialing scenarios shown in FIG. 8A.

FIG. 9A illustrates an exemplary table 900A that shows the action the mobile device takes upon receiving U.S. numbers when operating in a CDMA network of a country other than the reference country.

FIG. 9B illustrates generation/modification of a particular U.S. number for each of the assisted dialing scenarios shown in FIG. 9A.

FIG. 10A illustrates an exemplary table showing the action the mobile device takes upon receiving U.S. numbers as defined in the table.

FIG. 10B illustrates generation/modification of a particular local number for each of the assisted dialing scenarios shown in FIG. 10A.

FIG. 11A illustrates an exemplary table showing the action the mobile device will take upon receiving international numbers while operating in the reference country.

FIG. 11B illustrates generation/modification of a particular international number for each of the assisted dialing scenarios shown in FIG. 11A.

FIGS. 12A-12C illustrate exemplary tables showing how a particular number for each of the above-described scenarios may be modified in a GSM network depending on (1) the number's origin; (2) the number's formatting; and (3) the reference country set in the mobile device.

FIGS. 13A-13C illustrate exemplary tables showing how a particular number for each of the above-described scenarios may be modified in a CDMA network depending on (1) the number's origin; (2) the number's formatting; and (3) the reference country set in the mobile device.

FIG. 16 is a simplified functional block diagram of a computer that may be configured as a host or server.

FIG. 17 is a simplified functional block diagram of a personal computer or other work station or terminal device.

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The various technologies disclosed herein relate to a mobile device automatic selection of a proper international standard for dialing numbers both domestically and internationally, for example, including on either CDMA or GSM networks in different countries, as well as modifying user input of stored speed-dial numbers if and as needed to comply with the selected dialing standard. In keeping with the previous example, assume a user living in the United States frequently dials number 908-555-1212. Further, assume that the user goes outside of the United States on business and wishes to dial the same number. The assisted dialing method described herein enables the user to just dial the number as if the user were in the United States, and the mobile device would automatically append the correct information to make the call from the country in which the user is located and/or from the network through which the user currently makes the call.

In one implementation, the assisted dialing may be activated manually. In this scenario, an assisted dialing menu may be displayed on the mobile device, requesting that the user of the mobile device select the assisted dialing option. The assisted dialing menu option may be available to the user under a "Call Setting" folder in user interface offered by the mobile device. When the user selects the assisted dialing menu, a help option with basic usage may be made available to the user.

In another implementation, the assisted dialing may be automatically activated. Automatically activating the assisted dialing option may include having the assisted dialing option ON as a default for the mobile device. Alternatively, automatically activating the assisted dialing option may include detecting the mobile device is roaming out of the mobile device's home country, and turning the assisted dialing option ON upon detecting that the mobile device is roaming outside of the mobile device's home country. With assisted dialing menu, there may be the option to turn assisted dialing ON or OFF. The default setting for the assisted dialing, however, may be set to ON.

Figure 1:
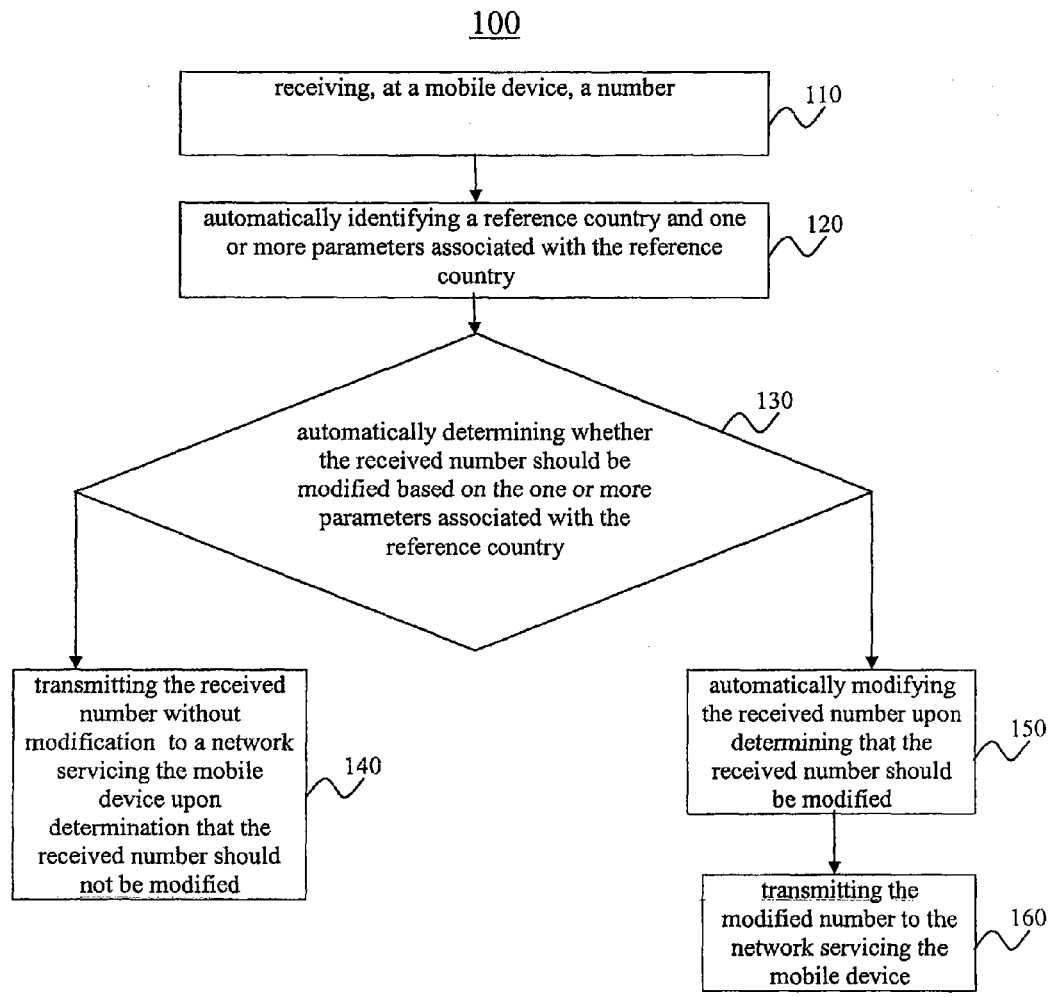
FIG. 1 illustrates an exemplary process used by a mobile device to enable assisted dialing.

FIG. 1 illustrates an exemplary process 100 used by a mobile device to enable assisted dialing. The process 100 begins with the mobile device receiving a number (110). The number may be received from an idle mode of the mobile device (e.g., directly entered by the user). Alternatively, the number may be received from the contact list or other list stored in the mobile device, typically in response to a user selection. The assisted dialing from idle ensures that a proper IDD code is in place for international dialing. The assisted dialing from idle is described in more detail below under Section 1, Heading Dialing From Idle. The assisted dialing from the contact list ensures that calls to contact list numbers are successfully dialed wherever the mobile device is in the world. The assisted dialing from contact list is described in more detail below under Section 2, Heading Dialing From Contact List. Of course, similar assisted dialing processing can apply to dialing from other lists, e.g. from various recent call lists stored by the mobile phone.

The mobile device automatically identifies a reference country and one or more parameters associated with the reference country (120). The reference country may be previously set by the user. The reference country provides a reference point with which dialed numbers (either from idle, contact list, etc.) can be compared for determining whether modification to the dialed string is necessary. The reference countries may include all countries listed in the Mobile Country Code (MCC). The default reference country may be the United States or another home country specified by the user.

The mobile device may include an option in the assisted dialing menu to allow the user to see the details regarding the reference country. In one aspect, the reference country is a device level parameter and cannot be set per contact. For example, the user and/or manufacture of the mobile device may be able to set the reference country for the mobile device but not be able to set the reference country specifically for each of the contacts stored in the user's contact list. Alternatively, the user of the mobile device may be able to set the reference country specific to each contact stored in the user's contact list. The reference country detail may include some or all of the following parameters:

country code—populated based on reference country and MCC lookup table

IDD code—populated based on reference country and MCC lookup table

NDD code—populated based on reference country and MCC lookup table area/city code—default is determined by first three digits of Mobile Directory Number (MDN)

National Number Length—default is determined by MDN length

All of the attributes may be editable and savable. Additionally, there may be an option to restore default attributes. To illustrate an example, since the United States is the default reference country, the pre-populated details of a device with MDN 908-123-4567 are as follows:

country code—1

IDD code—011

NDD code—1 area/city code—908

National Number Length—10 (including area/city code length)

Based on the one or more parameters associated with the reference country, the mobile device automatically determines whether the received number should be modified (130). Determining whether the mobile number should be modified may include identifying the country in which the mobile device is located and whether the received number is associated with the identified country. The location of the mobile device may be identified via a GPS or from a signature of the wireless network currently servicing the mobile device.

To determine whether or not the received number is local to the country in which the mobile device is operating, the mobile device may use one or more of a variety of analysis techniques. In one example, the mobile device may identify the national number length of the country of operation and compare it to the length of the received number. If the received number includes more number than the national number length, then the mobile device may assume the number is international. For another example, if the received number begins with the IDD code of the country in which the mobile device is operating, the mobile device may assume that the number is international.

Based on the country in which the mobile device is operating and the association of the received number with the identified country, the received number may or may not be modified using associated dialing option (140, 150). In one scenario, the mobile device identifies the country of operation as the reference country and also identifies that the received number matches the pattern of the reference country. In this scenario, the mobile device may not modify the received number and may transmit it to a network servicing the mobile device (140). In keeping with the previous example, while operating in the United States, the user may dial 908-555-1212. The mobile device recognizes that the country of the operation is the same as the reference country and also recognizes that the received number is associated with the reference country. Therefore, the mobile device may dial the number as entered.

In another scenario, the mobile device may determine that the country of operation is indeed the reference country but the received number is not associated with the reference country (e.g., an international number). In this scenario, the mobile device automatically modifies the received number as necessary (150) and transmits the modified number to the wireless network currently servicing the mobile device (160). For example, while operating in the reference country (e.g., the United States), the user may dial 44987654321. The number includes the same number of digits as the national number length of the United States. However, since the number does not begin with the country code of the United States (e.g., '1') and the first three numbers do not match any of the area codes in the North American Number Plan (NANP), the mobile device assumes the number is international and modifies the number to include the IDD code of the United States.

In yet another scenario, the mobile device may determine that it is operating outside of the reference country but the received number is associated with the reference country. In this scenario, the mobile device identifies an IDD code of the country in which the mobile device is located and automatically modifies the received number to include this IDD code. For example, while operating in China, the user may call 908-555-1212 from its contact list. Since the reference country is set to the United States, the mobile device may assume the number is associated with the reference country and modifies it to include the IDD code of China along with the country code of the United States. As such, the device may dial 00-1-908-555-1212. The above described scenarios are illustrated in more details with respect to FIGS. 2-8.

Moving forward, the mobile device may notify the user that the received number is being modified and may display to the user the modified number. In one example, the dial screen displays the string "Assisted Dialing On" when assisted dialing is on. While the call is being connected and if the number entered has been manipulated with assisted dialing, the In-Call screen displays the following, "Assisted Dialing . . . " followed by the number that is dialed as a result of assisted dialing. While the call is being connected and if the number has not been manipulated with assisted dialing, the In-Call screen displays the following, "Calling . . . " and the number that was dialed. The call log may show the number that was dialed as a result of manipulation by assisted dialing, else if no manipulation has occurred the call log may just display the number originally entered by the user.

With this overview, the following sections describe in more detail the assisted dialing functionality of the mobile device. In particular, Section 1, describes assisted dialing when the number is directly entered into the mobile device (e.g., mobile device is in an idle mode), whereas, Section 2, describes assisted dialing when the number is received from a contact list (e.g., a contact list stored in the mobile device). When modifying the number, the mobile device may be able to make more assumptions about the numbers received from the contact list than the numbers directly entered into the mobile device. This is mainly based on the assumption that users usually save numbers to contact list per dialing rules of the selected reference country. As such, the mobile device modifies the contact list numbers to the correct format when traveling internationally outside the reference country. Both Sections 1, 2 describe the operation of the assisted dialing program when the mobile device receives a local number and an international number while operating in a home network or a visited network.

1. Dialing from Idle 1.1. In Home Network

The home network may be a 3GPP2 type CDMA technology network or a 3GPP technology network. For purposes of providing examples of assisted dialing, the instant application describes the CDMA network to be the home network and the GSM network to be the visited network. One of ordinary skill in the art, however, recognizes that other arrangements are possible. For example, the home network may correspond to the GSM network and the visited network may correspond to the CDMA network. Additionally, for purposes of discussion and in keeping with the previous example, the reference country is assumed to be the United States.

A. Dialing U.S. Numbers or Other NANP Numbers

FIG. 2A illustrates an exemplary table 200A that shows the action the mobile device will take upon receiving U.S. telephone numbers or other NANP numbers while operating in the United States. In the following examples, referring to FIGS. 2A and 2B, the mobile device determines the country of operation is the reference country and that the received number is associated with the reference country. Based on such determination, the mobile device determines whether or not to modify the received number.

As noted above, the mobile device may use GPS or signature of the wireless network currently servicing the mobile device to determine that the mobile device is operating in the reference country. To determine whether or not the received number is associated with the reference country, the mobile device may reference the NANP directory. The ten digit numbers that begin with any of the area codes listed in NANP database may be assumed to be NANP numbers. Similarly, the eleven digit numbers that begin with the NDD code of the United States followed by any of the area codes shown in the NANP directory may be assumed to be NANP numbers. Alternatively or additionally, the mobile device may determine that the received number is associated with the reference country by identifying the number of digits in the received number and comparing it with the national number length of the reference country. As noted earlier, the mobile device may determine that the received number is an international number if it includes more digits than the national number length of the reference country. Alternatively or additionally, the mobile device may determine that the received number is an international number if it includes eleven digits but does not begin with one. Alternatively or additionally, the mobile device may determine that the received number is an international number if it includes ten digits but does not begin with any of the NANP area codes listed in a lookup table.

Upon determining that the number is associated with the reference country and that the mobile device is operating in the reference country the mobile device does not modify the number. To illustrate further, table 200A shows that (1) when the dialed number is a seven digit phone number, the device does not modify the number and dials the number as entered; (2) when the dialed number is a ten digit phone number (e.g., a three digit area code followed by a seven digit phone number), the device does not modify the number and dials the number as entered; (3) when the dialed number is an eleven digit number (e.g., one digit U.S. NDD code, followed by a three digit area code and a seven digit phone number), the device does not modify the number and dials the number as entered; and (4) when the dialed number includes '+' and eleven digits (e.g., '+', followed by a U.S. NDD code followed by a three digit area code and a seven digit phone number), the device dials the number without the '+'.

FIG. 2B illustrates generation/modification of a particular U.S. number for each of the scenarios shown in FIG. 2A. In the illustrated example, the United States is a reference country, the mobile device is operating in the United States, and the mobile device attempts to reach U.S. number 908-765-4321 via a CDMA network.

B. Dialing International Numbers

In another example, instead of dialing numbers within the reference country, the mobile device may dial international numbers while operating in the reference country. In keeping with the previous example, the reference country is the United States, and the home network is the CDMA network. FIG. 3A illustrates an exemplary table 300A showing the action the mobile device will take upon receiving an international number while operating in the reference country.

The manner in which the mobile device can determine it is operating in the reference country was described above and therefore is not described in more detail. The mobile device can identify international numbers by comparing the received number with the format shown in table 300A. The table 300A defines the format of the international numbers. As shown in table 300A: (1) when the dialed number includes a three digit U.S. IDD code, country code, area/city code, and phone number, the dialed number is assumed to be international and the mobile device does not modify the number and dials the number as entered; (2) when the dialed numbers includes '+', country code, area/city code, and phone number, the dialed number is assumed to be international and the mobile device replaces the '+' with U.S. IDD code '011' since it is operating in the CDMA network and dials the remaining numbers as entered; (3) when the dialed number includes country code (other than 1), area/city code, and phone number, the dialed number is assumed to be international and the mobile device dials "011" followed by the number as entered. In particular, when the number includes 11 digits or more and also does not begin with '1', it is assumed to be an international number. Therefore, the mobile device modifies it to include the U.S. IDD code.

FIG. 3B illustrates generation/modification of a particular international number for each of the assisted dialing scenarios shown in FIG. 3A. In the illustrated example, the United States continues to be the reference country, the mobile device is operating in the United States, and the mobile device attempts to reach a United Kingdom number 449876543211. The IDD code for the United States is 011 and the country code for the United Kingdom is 44.

1.2. In Visited Network

Instead of making local or international calls from inside the reference country, the mobile device may make calls from outside of the reference country using a visited network. Being a global device, the mobile device may travel from a home network to a visited network, which may use the same or a different technology. In keeping with the previous example, the mobile device may travel from the CDMA network of the United States to a GSM network of the United Kingdom. Although the visited network is described in this application as being associated with a country different than that of the home network, one of ordinary skill in the art recognizes that the visited network may very well be associated with the home country. That is, the home country may include both the home network and the visited network. For example, the home country may support both the CDMA network and the GSM network.

The following descriptions describe dialing local and international numbers while the mobile device is operating in a GSM network outside the reference country.

A. Dialing Local Numbers

The global devices may be able to dial '+' when in GSM/UMTS networks. FIG. 4A illustrates an exemplary table 400A that shows the action the mobile device takes upon receiving local numbers in a GSM/UMTS network of a country different than the reference country. For purposes of discussion and in keeping with the previous example, the mobile device is operating in the United Kingdom while the reference country is the United States. The network servicing the mobile device is a GSM network.

When assisted dialing is enabled, the mobile device may need to determine the country in which it is operating. To do so, the mobile device may use GPS or signature of the wireless network currently servicing the mobile device. In this scenario, the mobile device determines based either on the GPS or the signature that it is operating in the United Kingdom. The mobile device may also determine whether the received number is associated with the United Kingdom. To do so, the mobile device may compare the format of the received number with the format of the numbers in the United Kingdom. If they match, the mobile device may assume the number is local. Otherwise, the mobile device may assume the number is international.

In GSM/UMTS networks local numbers are defined as shown in FIG. 4A. FIG. 4A shows (1) when the dialed number includes '+', a local country code, an area/city code, a phone number, the mobile device does not modify the number and dials the number as entered; (2) when the dialed number includes a local IDD code, a local country code, an area/city code, a phone number, the mobile device does not modify the number and dials the number as entered; (3) when the dialed number includes an NDD code, an area/city code, a phone number, the mobile device does not modify the number and dials the number as entered; and (4) when the dialed number begins with the reference country IDD code, the mobile device may modify the number. In particular, the mobile device may modify the number sequence that begins with the reference country IDD code and replace it with '+.' However, if the assisted dialing of local numbers in GSM/UMTS is not active, the mobile device may not modify the number sequence and may dial the number as entered. If the dialed number does not match any of the above-described formats 1-4, the number may be dialed as entered.

FIG. 4B illustrates generation/modification of a particular local number for each of the assisted dialing scenarios shown in FIG. 4A. In the illustrated example, the United States is a reference country, and the mobile device is operating on a United Kingdom GSM/UMTS network and is trying to reach a United Kingdom number 449876543211. The NDD code for the United Kingdom is 0, and the IDD code for the United Kingdom is 00. The country code for the United Kingdom is 44.

As shown, for a device with the reference country set to the United States and a user who is used to dialing international numbers from the United States with the following format '011', a country code, an area/city code, a phone number, the device replaces '011' with '+' and dials the number as in (1) shown above. Assisted dialing may not work correctly where the user is actually trying to reach a number that begins with NDD '0' followed by an area/city code beginning with '11' or a number that begins with NDD '01' followed by an area/city code '1'. For this case, the user may have to turn off assisted dialing.

B. Dialing International Numbers

In another example, the mobile device operating in the United Kingdom GSM/UMTS network may make international calls instead of local calls. In keeping with the previous example, the reference country is the United States, the home network is the CDMA network and the visited network is the GSM/UMTS network. FIG. 5A illustrates an exemplary table 500A that shows the action the mobile device takes upon receiving international numbers while operating in a GSM/UMTS network of a country different than the reference country.

In a GSM/UMTS network, international numbers are defined as shown in table 500A. Table 500A shows that (1) when the dialed number includes '+', a country code, an area/city code, a phone number, the device does not modify the number and dials the number as entered; (2) when the dialed number includes a local IDD code, a country code, an area/city code, a phone number, the device does not modify the number and dials number as entered or the device shall replace the IDD code with a '+' and transmit the remaining digits as entered; and (3) when dialing international numbers in GSM/UMTS Networks, the device modifies a number sequence that begins with the reference country IDD code and replace it with the '+'. If the dialed number does not match any of the above-described formats 1-3, the number may be dialed as entered.

FIG. 5B illustrates generation/modification of a particular international number for each of the assisted dialing scenarios shown in FIG. 5A. In the illustrated example, the United States is a reference country, the mobile device is operating in the United Kingdom GSM/UMTS network, and the mobile device attempts to reach Chinese number 861030123456. The IDD code of the United Kingdom is 00. The country code of China is 86. The IDD code of the United States is 011.

For a device with reference country set to the United States and a user who is used to dialing, from the United States, international numbers as '011', a country code, an area/city code, a phone number, the device replaces '011' with '+' and sends the number as in (1) above. Assisted dialing may not work correctly when the user is trying to reach a number that begins with an NDD code of '0' followed by an area/city code beginning with '11' or when the user is trying to reach a number that begins with an NDD code of '01' followed by an area/city code '1'. For this case, the user may have to turn off the assisted dialing.

C. Dialing U.S. Numbers or Other NANP Numbers

The international number dialed in the above Section 1.2.B may be a number associated with the reference country. That is, the device may be located in the visited network and may be dialing a number associated with the home network. FIG. 6A illustrates an exemplary table 600A that shows the action the mobile device takes upon receiving U.S. numbers while operating in a GSM/UMTS network of a country different from the reference country. While on GSM/UMTS network, U.S. numbers are defined in a manner shown in table 600A. As shown in table 600A: (1) when the dialed number includes '+', a U.S. country code '1', an area/city code, a phone number, the device does not modify the number and dials the number as entered; (2) when the dialed number includes a local IDD code, a U.S. country code '1', an area/city code, a phone number, the device does not modify the number and dials the number as entered; (3) when dialing U.S. or other NANP numbers in a GSM/UMTS Network, the device modifies a number sequence that begins with the reference country IDD code and replace it with the '+'. A local IDD code followed by 11 digit numbers beginning with a '1' followed by any of the area codes in the NANP Area codes table is assumed to be a NANP number. If the dialed number does not match any of the above-described formats 1-3, the number may be dialed as entered.

FIG. 6B illustrates generation/modification of a particular U.S. number for each of the assisted dialing scenarios shown in FIG. 6A. In the illustrated example, the United States is the reference country, the mobile device is operating in the United Kingdom GSM/UMTS network, and the mobile device attempts to reach U.S. number 9087654321. The IDD code of the United Kingdom is 00. The country code of the United States is 1, and the IDD code of the United States is 011.

1.3. In International Home Network

Instead of operating in its home network, the mobile device may travel and instead may be operating in a network of another country that is the same as its home network. For example, instead of operating in the United States CDMA network, the mobile device may travel to China and may be operating in a Chinese CDMA network. The following descriptions describe dialing local and international numbers while the mobile device is operating in a CDMA network of a country different from the reference country.

A. Dialing Local Numbers

FIG. 7A illustrates an exemplary table 700A that shows the action the mobile device takes upon receiving local numbers while operating in a CDMA network of a country other than the reference country. As usual, the mobile device may determine the country in which it is operating. In this scenario, the mobile device recognizes that it is operating in China. The mobile device may then determine whether it is dialing a number local to the Chinese network or it is dialing an international number.

While roaming on an international CDMA network (e.g., the Chinese CDMA network), local numbers of the country that the mobile device is currently in are defined as shown in table 700A. As shown in table 700A: (1) when the dialed number includes '+', a local country code, an area/city code, a phone number, the mobile device derives the Over the Air (OTA) country code and compares it with the numbers appearing after the '+' to determine if the entered number is local, and if the entered number is local, the '+' and country code, may be replaced with the OTA NDD code and the number may be dialed as OTA NDD code, followed by area/city code and phone number; (2) when the dialed number includes a local IDD code, a local country code, an area/city code, a phone number, the mobile device compares the OTA IDD code and the OTA country code with the numbers entered to determine if the entered number is local, and if so, the entered IDD code and the country code are replaced with the OTA NDD code and the number is dialed as OTA NDD code followed by an area/city code and a phone number; (3) when the dialed number includes an NDD code, an area/city code, a phone number, the mobile device does not modify the number and dials the number as entered; and (4) the device modifies a number sequence that begins with the reference country IDD code and instead replaces it with the OTA IDD code. If the dialed number does not match any of the above-described formats 1-4, the number may be dialed as entered.

FIG. 7B illustrates generation/modification of a particular local number for each of the assisted dialing scenarios shown in FIG. 7A. In the illustrate example, the United States is the reference country, the mobile device is operating in a Chinese CDMA network and is trying to contact Chinese number 861030123456. The IDD code for China is 00, and the NDD code for China is 0. The country code for China is 86.

For a device with the reference country set to the United States and a user who is used to dialing, from the United States, international numbers as '011', a country code, an area/city code, a phone number, the device replaces '011' with the OTA IDD code and performs the local number check.

B. Dialing International Numbers

In another example, the mobile device operating in the Chinese CDMA network instead of making a local call may make an international call. In keeping with the previous example, the reference country is the United States and the home network is the CDMA network. FIG. 8A illustrates an exemplary table 800A that shows the action the mobile device takes upon receiving international numbers while roaming in a CDMA network of a country other than the reference country.

While roaming in an international CDMA network, international numbers are defined as shown in table 800A. As shown in table 800A: (1) when the dialed number includes '+', a country code, an area/city code, a phone number, the device determines if the number following '+' sign corresponds to the OTA country code, and if not, the mobile device identifies the appropriate OTA IDD code and replaces the '+' with the OTA IDD code and the number is sent as OTA IDD code, followed by a country code, an area/city code and a phone number; (2) when the dialed number includes an IDD code, a country code, an area/city code, a phone number, the device determines if the dialed number begins with OTA IDD code followed by numbers that do not match the OTA country code, and if so, the device sends the number as is with no modification. If, however, the numbers following OTA IDD code do match the OTA country code, the mobile device replaces OTA IDD code and the country code with the OTA NDD code and dials the number; (3) the device modifies a number sequence that begins with the reference country IDD code and instead replaces it with the OTA IDD code. If the dialed number does not match any of the above-described formats 1-3, the number may be dialed as entered.

FIG. 8B illustrates generation/modification of a particular international number for each of the assisted dialing scenarios shown in FIG. 8A. In the illustrated example, the United States is the reference country, the mobile device is operating in a Chinese CDMA network, and the mobile device attempts to contact United Kingdom number 44987654321. The IDD code for China is 00, and the country code for UK is 44.

C. Dialing U.S. Numbers or Other NANP Numbers

In one example, the international number dialed in the Section 1.3.B may be a number associated with the reference country. That is, the device may be located outside of the reference country and may be attempting to contact a number inside the reference country. FIG. 9A illustrates an exemplary table 900A that shows the action the mobile device takes upon receiving U.S. numbers when operating in a CDMA network of a country other than the reference country.

While operating in an international CDMA network, United States numbers may be entered by the user in a format shown in table 900A. As shown in table 900A: (1) when the dialed number includes '+', a country code '1', an area/city code, a phone number, the device determines the appropriate OTA IDD code, replaces the '+' with the OTA IDD code, and dials the OTA IDD code followed by the country code '1', the area/city code, and the phone number; (2) when the dialed number includes an IDD code, a country code '1', an area/city code, a phone number, the device determines if the IDD code entered matches the OTA IDD code. If so, the device dials the number unmodified. Otherwise, the device may replace the entered IDD code with the OTA IDD code. If the dialed number does not match any of the above-described formats 1 and 2, the number may be dialed as entered.

FIG. 9B illustrates generation/modification of a particular U.S. number for each of the assisted dialing scenarios shown in FIG. 9A. In the illustrated example, the United States is a reference country, the mobile device is operating in a Chinese CDMA network, and the mobile device attempts to contact a United States number 9087654321. The IDD code for China is 00, and the country code for US is 1.

2. Dialing from Contact List

Assisted dialing from the contact list is implemented to try to make international dialing as smooth as possible. Assumptions for a global contact list may be that the users save numbers to their contact lists per dialing rules of the selected reference country. For example, a U.K. number may be saved just as the user would dial the U.K. number from the U.S. if the reference country is set to the U.S. For another example, a U.S. number may be saved just as the user would dial the U.S. number from the U.S. if the reference country is set to the U.S. Similarly, a U.K. number may be saved just as the user would dial the U.K. number from the U.K. if the reference country is set to the U.K. Therefore, if numbers in the contact list are stored in the format needed when calling while in the reference country, then the device would modify the contact list numbers to the correct format for dialing when traveling internationally outside of the reference country The assisted dialing menu may be used when assisted dialing is ON and the user is trying to call a number from the contact list. The numbers in the contact list may be compared against the attributes of the reference country to determine the proper dialing sequence.

2.1. In Home Network

As described above with respect to Section 1.1, the home network may be a 3GPP2 type CDMA technology network or a 3GPP technology network. For purposes of providing examples of assisted dialing, the instant application describes the CDMA network to be the home network and the GSM network to be the visited network. One of ordinary skill in the art, however, recognizes that other arrangements are possible. For example, the home network may correspond to the GSM network and the visited network may correspond to the CDMA network. Additionally, for purposes of discussion and in keeping with the previous example, the reference country is assumed to be the United States. The following descriptions first describe dialing local numbers and then describe dialing international numbers while operating in the United States with the assisted dialing ON.

A. Dialing U.S. Numbers or Other NANP Numbers

FIG. 10A illustrates an exemplary table 1000A that shows the action the mobile device takes upon receiving U.S. numbers as defined in table 1000A. In the following examples, the mobile device may first determine the country in which it is operating. In this scenario, the mobile device determines that it is operating in the reference country. That is, the mobile device determines it is operating in the United States. The mobile device may then determine whether the received number is local or international.

While operating in the United States CDMA network, local numbers may be entered in a format shown in table 1000A. As shown in table 1000A: (1) when the dialed number is seven digits (e.g., a seven digit phone number), the device does not modify the number and dials the number as entered; (2) when the dialed number is ten digits (e.g., a three digit area code followed by a seven digit phone number), the device does not modify the number and dials the number as entered; (3) when the dialed number is eleven digits (e.g., one digit U.S. NDD code '1', followed by a three digit area code and a seven digit phone number), the device does not modify the number and dials the number as entered; and (4) when the dialed number includes '+' and eleven digits (e.g., '+' followed by a U.S. NDD code '1' followed by a three digit area code and a seven digit phone number), the device dials the number without the '+'. In particular, the number beginning with the '+' sign followed by an 11 digits beginning with a '1' and an area code in the NANP Area codes table is assumed to be a NANP number. If the dialed number does not match any of the above-described formats 1-4, the number may be dialed as entered.

FIG. 10B illustrates generation/modification of a particular local number for each of the assisted dialing scenarios shown in FIG. 10A. In the illustrated example, the U.S. is a reference country and the device is operating in a U.S. CDMA network and is attempting to contact U.S. number 9087654321. The NDD code for U.S. is 1.

B. Dialing International Numbers

In another example, the mobile device operating in the U.S. CDMA network may make an international call instead of making a local call. FIG. 11A illustrates an exemplary table 1100A that shows the action the mobile device will take upon receiving international numbers while operating in the reference country.

The international numbers are defined as shown in table 1100A when mobile device is operating in the reference country. As shown in table 1100A: (1) when the dialed number includes a three digit U.S. IDD code, a country code, an area/city code, and a phone number, the dialed number is assumed to be international and the mobile device does not modify the number and dials the number as entered; (2) when the dialed numbers includes '+', a country code, an area/city code, and a phone number, the dialed number is assumed to be international and the mobile device replaces the '+' with the U.S. IDD code '011' and dials the remaining numbers as entered; (3) when the dialed number includes a country code, an area/city code, and a phone number, the dialed number is assumed to be international and the mobile device dials '011' followed by the number as entered; (4) when the dialed number includes non U.S. IDD, country code, area/city code, phone number, the number is assumed to be international and the mobile device replaces the incorrect IDD code with '011.' This scenario may happen for a user used to dialing frequently from a non U.S. location. Referring again scenario (3), the mobile device modifies a number sequence that contain 11 digits and also does not begin with '1.' If the dialed number is greater than 11 digits, the mobile device assumes the number is international and modifies the number to include '011.'

FIG. 11B illustrates generation/modification of a particular international number for each of the assisted dialing scenarios shown in FIG. 11A. In the illustrated example, the U.S. is a reference country, the mobile device is operating in the U.S. CDMA network, and a mobile device is attempting to contact U.K. number 449876543211. The IDD code for the U.S. is 011 and the country code for the U.K. is 44.

2.2. In Visited Network

Instead of making local or international calls from inside the reference country, the mobile device may make calls from outside of the reference country using a visited network. Being a global device, the mobile device may travel from a home network to a visited network, which may be the same or a different technology. In keeping with the previous example, the mobile device may travel from the reference country CDMA network to a country with a GSM network (e.g., U.K.). The following descriptions describe dialing local and international numbers while the mobile device is operating in the GSM network outside the reference country.

A. Dialing Stored Numbers

The global devices may be able to dial '+' when in a GSM/UMTS network. Numbers that do not follow the following conventions are dialed as entered:

(1) when the contact list number includes '+', a country code, an area/city code, and a phone number, the device does not modify the number and dials the number as appears in the contact list;

(2) when the contact list number includes an IDD code, a country code, an area/city code, and a phone number, the device replaces the IDD code with '+' if the contact list number begins with the reference country IDD code and dials '+' followed by the remaining numbers as stored in the contact list;

(3) when the contact list number includes an NDD code, an area/city code, and a phone number, the device determines whether the contact list number begins with the reference country NDD code and whether the number of digits in the contact list number equals the reference country national number length plus the number of digits in the reference country NDD code. If so, the device replaces the NDD code with '+' and reference country code and dials '+' followed by the reference country code and the contact list number;

(4) when the contact list number includes an area/city code and a phone number, the device determines if the number of digits in the contact list number equals the reference country national number length. If so, the device dials '+' followed by the country code of the reference country and the contact list number. Otherwise, the number may be dialed as stored; and (5) when the number of digits in the contact list number equals the reference country national number length minus the number of digits in the reference country area/city code, the device adds '+,' the reference country code and the reference country area/city code to the contact list number.

FIGS. 12A-12C illustrate exemplary tables 1200A-1200C showing how a particular number for each of the above-described scenarios may be modified depending on (1) the number's origin; (2) the number's formatting; and (3) the reference country set in the mobile device. The table 1200A illustrates the actions the mobile device may take when operating in the U.K. GSM network and upon receiving, from a contact list, various U.S. number formats. The table 1200B illustrates the actions that the mobile device may take when operating in the U.K. GSM network and upon receiving, from a contact list, various Chinese number formats. The table 1200C illustrates the actions that the mobile device may take when operating in the U.K. GSM network and upon receiving, from a contact list, various U.K. number formats. The reference country may be one of U.S., China, or U.K. in each of the tables 1200A-1200C.

In table 1200A, the U.S. number is 19081234567, where 1 is the U.S. country code, 908 is the U.S. area code, and 1234567 is the number. As shown, in table 1200A, the number is stored with various formats. One format includes '+' followed by the U.S. number (e.g., +19081234567). In this scenario, as noted above in Section 2.2(A)(1), the mobile device dials the number as stored since the number complies with the U.K. GSM format. That is, regardless of the reference country, the mobile device dials +19081234567.

Another format includes the U.K. IDD code followed by the U.S. number (e.g., 0019081234567). As noted above in Section 2.2(A)(2), when the contact list number includes an IDD code, a country code, an area/city code, and a phone number, the device replaces the IDD code with '+' if the contact list number begins with the reference country IDD code and dials '+' followed by the remaining numbers as stored in the contact list. Here, when the U.S. is the reference country, the device determines that the IDD code of the number does not correspond to the U.S. IDD code. The device dials the number as stored since the number's formatting does not correspond to the format described in Section 2.2(A)(2) and also does not correspond to the formats described in the remaining sections. When, however, the reference country is the U.K. or China, the mobile device replaces the IDD code with '+' and dials the remaining numbers as stored according to the format specified in Section 2.2(A)(2). This is because the IDD code '00' matches the IDD code of China and U.K.

The U.S. number may also be stored as the U.S. number with the U.S. NDD code (e.g., 19081234567). As noted above in Section 2.2(A)(3), when the contact list number includes an NDD code, an area/city code, and a phone number, the device determines whether the contact list number begins with the reference country NDD code and whether the number of digits in the contact list number equals the reference country national number length plus the number of digits in the reference country NDD code. If so, the device replaces the NDD code with '+' and the reference country code and dials '+' followed by the reference country code and the contact list number.

Here, when the U.S. is the reference country, the device checks to see whether the NDD code of the contact list number matches the U.S. NDD code and whether the number of digits in the contact list number equals the U.S. national number length plus the number of digits in the U.S. NDD code. Since the NDD code of the contact list number matches the U.S. NDD code and the number of digits in the contact list number equals the U.S. national number length plus the number of digits in the U.S. NDD code, the device replaces the NDD code with '+' and the U.S. country code and dials '+' followed by the reference country code and the contact list number.

When China is the reference country, the device checks to see whether the NDD code in the contact list number matches the China NDD code and whether the number of digits in the contact list number equals the China national number length plus the number of digits in the China NDD code. Since the NDD code of the contact list number do not match the China NDD code, the device dials the number as stored in the contact list. The contact list number in this scenario is not dialed properly, and the user has to change the reference country to the U.S. for the number to be dialed properly.

When the U.K. is the reference country, the device checks to see whether the NDD code of the contact list number matches the U.K. NDD code and whether the number of digits in the contact list number equals the U.K. national number length plus the number of digits in the U.K. NDD code. Since the NDD code of the contact list number do not match the U.K. NDD code, the device dials the number as stored in the contact list. The user has to change the reference country to the U.S. for the number to be dialed properly.

The contact list number may also be stored without the U.S. NDD code (e.g., 9081234567). As pointed out above in Section 2.2(A)(4), when the contact list number includes an area/city code and a phone number, the device determines if the number of digits in the contact list number equals the reference country national number length. If so, the device dials '+' followed by the country code of the reference country and the contact list number. Otherwise, the number is dialed as stored. Accordingly, if the reference country is the U.S., the device replaces the NDD code of the reference country with the '+' sign and the country code of the reference country, and dials the remaining number as entered. If the number does not include the U.S. NDD code, the mobile device modifies the number to include the '+' sign and the country code of the reference country and dials the modified number. If, however, the reference country is not the U.S. (e.g., China or U.K.), then the mobile device dials the number as entered.

In yet another example, the U.S. number may be stored without the U.S. NDD code and the area code (e.g., 1234567). As pointed out above in Section 2.2(A)(5), when the number of digits in the contact list number equals the reference country national number length minus the number of digits in the reference country area/city code, the device adds the '+,' the reference country code and the reference country area/city code to the contact list number.

Here, when the U.S. is the reference country, the device determines whether the number of digits in the contact list number equals the U.S. national number length minus the number of digits in the U.S. area/city code. Since the number of digits in the contact list number equals the U.S. national number length minus the number of digits in the U.S. area/city code, the device adds the '+,' the U.S. country code and the U.S. area/city code to the contact list number. When China is the reference country, the device determines whether the number of digits in the contact list number equals China national number length minus the number of digits in the China area/city code. Since the number of digits in the contact list number do not equal the China national number length minus the number of digits in the China area/city code, the device dials the number as stored. Similarly, when the U.K. is the reference country, the device determines whether the number of digits in the contact list number equals the U.K. national number length minus the number of digits in the U.K. area/city code. Since the number of digits in the contact list number do not equal the U.K. national number length minus the number of digits in the U.K. area/city code, the device dials the number as stored.

In table 1200B, the Chinese number is 861030123456, where 86 is the China country code, 10 is the China area code, and 30123456 is the number. As shown, in table 1200B, the number is stored with various formats. One format includes the '+' sign followed by the Chinese number (e.g., +861030123456). In this scenario, as noted in Section 2.2(A)(1), the mobile device dials the number as stored since the number complies with the U.K. GSM format. That is, regardless of the reference country, the mobile device dials +861030123456.

Another format includes the U.S. IDD code followed by the Chinese number (e.g., 011861030123456). As noted above in Section 2.2(A)(2), when the contact list number includes an IDD code, a country code, an area/city code, and a phone number, the device replaces the IDD code with '+' if the contact list number begins with the reference country IDD code and dials '+' followed by the remaining numbers as stored in the contact list. Here, when the U.S. is the reference country, the device determines that the IDD code of the number corresponds to the U.S. IDD code. Therefore, the device replaces the IDD code with '+' and dials the remaining numbers as stored according to the format specified in Section 2.2(A)(2). When China or the U.K. is the reference country, the device determines that the IDD code of the number does not correspond to the China or the U.K. IDD code. The device dials the number as stored since the number's formatting does not correspond to the format described in Section 2.2(A)(2) and also does not correspond to the formats described in the remaining sections.

Another format may include the Chinese number with the U.K. IDD code (e.g., 00861030123456). Similar to the previous format, the device determines whether the IDD code of the contact list number matches the IDD code of the reference country. Here, when the U.S. is the reference country, the device determines that the IDD code of the number does not correspond to the U.S. IDD code. The device dials the number as stored since the number's formatting does not correspond to the format described in Section 2.2(A)(2) and also does not correspond to the formats described in the remaining sections. When, however, the reference country is the U.K. or China, the mobile device replaces the IDD code with '+' and dials the remaining numbers as stored according to the format specified in Section 2.2(A)(2). This is because the IDD code '00' matches the IDD code of China and U.K.

Another format includes the Chinese number without the country code but with the Chinese NDD (e.g., 01030123456). As noted above in Section 2.2(A)(3), when the contact list number includes an NDD code, an area/city code, and a phone number, the device determines whether the contact list number begins with the reference country NDD code and whether the number of digits in the contact list number equals the reference country national number length plus the number of digits in the reference country NDD code. If so, the device replaces the NDD code with '+' and the reference country code and dials '+' followed by the reference country code and the contact list number.

Here, when the U.S. is the reference country, the device checks to see whether the NDD code of the contact list number matches the U.S. NDD code and whether the number of digits in the contact list number equals the U.S. national number length plus the number of digits in the U.S. NDD code. Since the NDD code of the contact list number do not match the U.S. NDD code, the device dials the number as stored in the contact list. The contact list number in this scenario is not dialed properly, and the user has to change the reference country to, for example, China for the number to be dialed properly.

When China is the reference country, the device checks to see whether the NDD code in the contact list number matches the China NDD code and whether the number of digits in the contact list number equals the China national number length plus the number of digits in the China NDD code. Since the NDD code of the contact list number matches the China NDD code and the number of digits in the contact list number equals the China national number length plus the number of digits in the China NDD, the device replaces the NDD code with '+' and the China country code and dials '+' followed by the China country code and the contact list number. Similarly, when the U.K. is the reference country, the device checks to see whether the NDD code in the contact list number matches the U.K. NDD code and whether the number of digits in the contact list number equals the U.K. national number length plus the number of digits in the U.K. NDD code. Since the NDD code of the contact list number matches the U.K. NDD code and the number of digits in the contact list number equals the U.K. national number length plus the number of digits in the U.K. NDD code, the device replaces the NDD code with '+' and the U.K. country code and dials '+' followed by the U.K. country code and the contact list number.

In table 1200C, the U.K. number is 44987654321, where 44 is the U.K. country code, 9876 is the U.K. area code, and 543211 is the number. As shown, in table 1200C, the number is stored with various formats. One format includes the '+' sign followed by the U.K. number (e.g., +44987654321). In this scenario, as noted above with respect to Section 2.2(A)(1), the mobile device dials the number as stored since the stored number complies with the U.K. GSM format. That is, regardless of the reference country, the mobile device dials +44987654321.

Another format includes the U.S. IDD code followed by the U.K. number (e.g., 01144987654321). As noted above in Section 2.2(A)(2), when the contact list number includes an IDD code, a country code, an area/city code, and a phone number, the device replaces the IDD code with '+' if the contact list number begins with the reference country IDD code and dials '+' followed by the remaining numbers as stored in the contact list. Here, when the U.S. is the reference country, the device determines that the IDD code of the number corresponds to the U.S. IDD code. Therefore, the device replaces the IDD code with '+' and dials the remaining numbers as stored according to the format specified in Section 2.2(A)(2). When China or the U.K. is the reference country, the device determines that the IDD code of the number does not correspond to the China or the U.K. IDD code. The device dials the number as stored since the number's formatting does not correspond to the format described in Section 2.2(A)(2) and also does not correspond to the formats described in the remaining sections.

Another format may include the U.K. number with the China IDD code (e.g., 0044987654321). Similar to the previous format, the device determines whether the IDD code of the contact list number matches the IDD code of the reference country. Here, when the U.S. is the reference country, the device determines that the IDD code of the number does not correspond to the U.S. IDD code. The device dials the number as stored since the number's formatting does not correspond to the format described in Section 2.2(A)(2) and also does not correspond to the formats described in the remaining sections. When, however, the reference country is the U.K. or China, the mobile device replaces the IDD code with '+' and dials the remaining numbers as stored according to the format specified in Section 2.2(A)(2). This is because the IDD code '00' matches the IDD code of China and U.K.

Another format includes the U.K. number without the country code but with the U.K. NDD (e.g., 0987654321). As noted above in Section 2.2(A)(3), when the contact list number includes an NDD code, an area/city code, and a phone number, the device determines whether the contact list number begins with the reference country NDD code and whether the number of digits in the contact list number equals the reference country national number length plus the number of digits in the reference country NDD code. If so, the device replaces the NDD code with '+' and the reference country code and dials '+' followed by the reference country code and the contact list number.

Here, when the U.S. is the reference country, the device checks to see whether the NDD code of the contact list number matches the U.S. NDD code and whether the number of digits in the contact list number equals the U.S. national number length plus the number of digits in the U.S. NDD code. Since the NDD code of the contact list number do not match the U.S. NDD code, the device dials the number as stored in the contact list. The contact list number in this scenario is not dialed properly, and the user has to change the reference country to, for example, China for the number to be dialed properly.

When China is the reference country, the device checks to see whether the NDD code in the contact list number matches the China NDD code and whether the number of digits in the contact list number equals the China national number length plus the number of digits in the China NDD code. Since the NDD code of the contact list number matches the China NDD code and the number of digits in the contact list number equals the China national number length plus the number of digits in the China NDD, the device replaces the NDD code with '+' and the China country code and dials '+' followed by the China country code and the contact list number. Similarly, when the U.K. is the reference country, the device checks to see whether the NDD code in the contact list number matches the U.K. NDD code and whether the number of digits in the contact list number equals the U.K. national number length plus the number of digits in the U.K. NDD code. Since the NDD code of the contact list number matches the U.K. NDD code and the number of digits in the contact list number equals the U.K. national number length plus the number of digits in the U.K. NDD code, the device replaces the NDD code with '+' and the U.K. country code and dials '+' followed by the U.K. country code and the contact list number.

2.3. In International Home Network

Instead of operating in its home network, the mobile device may travel and instead may be operating in another country's network that is the same as its home network. For example, instead of operating in the U.S. CDMA network, the mobile device may travel to China and may be operating in the Chinese CDMA network. The following descriptions describe dialing local and international numbers while the mobile device is operating in a CDMA network of a country different from the reference country.

A. Dialing Stored Numbers

A contact list number are defined in the following formats. Numbers that do not follow the following conventions may be dialed as stored:

(1) when the contact list number includes '+', a country code, an area/city code, and a phone number, the device determines if the contact list number is local to where the device is located. To do so, the device determines whether the numbers following '+' correspond to the OTA country code. Based on the result of this determination, the device may take one of the following actions: (A) if the numbers following '+' correspond to the OTA country code, the device replaces '+' and the country code with the OTA NDD code followed by the remaining numbers in the contact list number; and (B) if numbers following '+' do not correspond to the OTA country code, the device replaces '+' with the OTA IDD code followed by the remaining numbers in the contact list number;

(2) when the contact list number includes a reference country IDD code or an OTA country IDD code followed by a country code, an area/city code, a phone number, the device determines if the contact list number is local to where the device is located. To do so, similar to the method shown in Section 2.3(A)(1), the device determines whether the numbers following the IDD code correspond to the OTA country code. Based on the result of this determination, the device may take one of the following actions: (A) if the numbers after the IDD code correspond to the OTA country code, the device replaces the IDD code and the country code with the OTA NDD code and dials the OTA NDD code followed by remaining numbers in the contact list number; and (B) if the numbers after the IDD code do not correspond to the OTA country code, the device takes the following actions depending on whether the IDD code corresponds to the reference country or to the OTA country: (i) if the IDD code is the reference country IDD code, the device replaces the IDD code with the OTA IDD code and dials the OTA IDD code followed by the remaining numbers in the contact list number; and (ii) if the IDD code is the OTA IDD code, the device dials the contact list number as is with no modification;

(3) when the contact list number includes an NDD code, an area/code, and a phone number, the devices takes one of the following actions: (A) when the contact list number begins with either a reference country NDD code or an OTA NDD code, a country code of the reference country is the same as the OTA country code, and number of digits in the contact list number equals the reference country national number length plus number of digits in the reference country NDD code, the device dials the contact list number as is without modification; and (B) when the contact list number includes the reference country NDD code or the OTA NDD code, the reference country code is not the same as the OTA country code, and number of digits in the contact list number equals the reference country national number length plus the number of digits in the reference country NDD code, the device replaces the NDD code identified in the contact list number with the OTA IDD code followed by the country code of the reference country and dials the remaining numbers as stored;

(4) when the number of digits in the contact list number equals the reference country national number length and the reference country code is not the same as the OTA country code, the device dials the OTA IDD code followed by the reference country code and the contact list number; and (5) when the number of digits in the contact list number equals the reference country national number length minus the number of digits in the reference country area/city code and the reference country code is not the same as the OTA country code, the device dials the OTA IDD code followed by the reference country code, the reference country area/city code, and the contact list number.

FIGS. 13A-13C illustrate exemplary tables 1300A-1300C showing how a particular number for each of the above-described scenarios may be modified depending on (1) the number's origin; (2) the number's formatting; and (3) the reference country set in the mobile device. The table 1300A illustrates the actions the mobile device may take when operating in China CDMA network and upon receiving, from a contact list, various U.S. number formats. The table 1300B illustrates the actions that the mobile device may take when operating in China CDMA network and upon receiving, from a contact list, various Chinese number formats. The table 1300C illustrates the actions that the mobile device may take when operating in China CDMA network and upon receiving, from a contact list, various U.K. number formats. The reference country may be one of U.S., China, or U.K. in each of the tables 1300A-1300C.

In table 1300A, the U.S. number is 19081234567, where 1 is the U.S. country code, 908 is the U.S. area code, and 1234567 is the number. As shown, in table 1300A, the number is stored with various formats. One format includes '+' followed by the U.S. number (e.g., +19081234567). In this scenario, the mobile device determines if the contact list number is a local number. To this end, the mobile device determines whether the numbers following '+' correspond to the OTA country code. As noted above, in Section 2.3(A)(1), if the numbers following '+' correspond to the OTA country code, the device replaces '+' and the country code with the OTA NDD code and dials the number as OTA NDD code followed by the remaining numbers in the contact list number. If, however, the numbers following '+' do not correspond to the OTA country code, the device replaces '+' with the OTA IDD code and dials the number as OTA IDD code followed by the remaining numbers in the contact list number. Here, the numbers following '+' do not correspond to the OTA country code. Therefore, the device replaces '+' with the OTA IDD code and dials the remaining numbers as entered. The device takes this action regardless of the reference country.

Another format includes the U.K. IDD code followed with the U.S. country code, the area code, and the phone number (e.g., 0019081234567). As noted above with respect to Section 2.3(A)(2), when the contact list number includes a reference country IDD code or an OTA country IDD code followed by a country code, an area/city code, a phone number, the device determines if the contact list number is a local number. To do so, similar to the method shown in Section 2.3(A)(1), the device determines whether the numbers following the IDD code correspond to the OTA country code. Based on the result of this determination, the device may take one of the following actions: (A) if the numbers after the IDD code correspond to the OTA country code, the device replaces the IDD code and the country code with the OTA NDD code and dials the OTA NDD code followed by remaining numbers in the contact list number; and (B) if the numbers after the IDD code do not correspond to the OTA country code, the device takes the following actions depending on whether the IDD code corresponds to the reference country or to the OTA country: (i) if the IDD code is the reference country IDD code, the device replaces the IDD code with the OTA IDD code and dials the OTA IDD code followed by the remaining numbers in the contact list number; and (ii) if the IDD code is the OTA IDD code, the device dials the contact list number as is with no modification.

Here, when the U.S. is the reference country, the device determines whether the IDD code corresponds to one of the U.S. IDD code or the OTA IDD code. Since the IDD code matches one of the U.S. IDD code or the OTA IDD code (e.g., it matches the OTA IDD code), the device determines if the contact list number is a local number. To this end, the mobile device determines whether the numbers following the IDD code correspond to the OTA country code. Since the numbers following the IDD code do not correspond to the OTA country code, the device uses the method of Section 2.3(A)(2)(B) to modify/dial the contact list number. The device determines whether the IDD code matches the U.S. IDD code or the OTA IDD code. Here, as noted above, the IDD code matches the OTA IDD code. Therefore, the device dials the contact list number as is with no modification.

When China is the reference country, the device determines whether the IDD code corresponds to the China IDD code (e.g., the reference country and the OTA country are the same in this scenario). Since the IDD code matches the China IDD code, the device determines if the contact list number is a local number. To this end, the mobile device determines whether the numbers following the IDD code correspond to the OTA (e.g., China) country code. Since the numbers following the IDD code do not correspond to the OTA country code, the device uses the method of Section 2.3(A)(2)(B) to modify/dial the contact list number. The device dials the contact list number as is with no modification since the IDD code matches the OTA IDD code.

When the U.K. is the reference country, the device determines whether the IDD code corresponds to one of the U.K. IDD code or the OTA IDD code. Here, IDD code matches both the U.K. IDD code and the OTA IDD code. The device then determines if the contact list number is a local number. To this end, the mobile device determines whether the numbers following the IDD code correspond to the OTA country code. Since the numbers following the IDD code do not correspond to the OTA country code, the device uses the method of Section 2.3(A)(2)(B) to modify/dial the contact list number. The device dials the contact list number as is with no modification since the IDD code matches the OTA IDD code.

The U.S. number may also be stored as the U.S. number with the U.S. NDD code (e.g., 19081234567). As noted above in Section 2.3(A)(3), when the contact list number includes an NDD code, an area/code, and a phone number, the device takes one of the following actions: (A) when the contact list number begins with either a reference country NDD code or an OTA NDD code, a country code of the reference country is the same as the OTA country code, and number of digits in the contact list number equals the reference country national number length plus the number of digits in the reference country NDD code, the device dials the contact list number as is without modification; and (B) when the contact list number includes the reference country NDD code or the OTA NDD code, the reference country code is not the same as the OTA country code, and number of digits in the contact list number equals the reference country national number length plus the number of digits in the reference country NDD code, the device replaces the NDD code identified in the contact list number with the OTA IDD code followed by the country code of the reference country and dials the remaining numbers as stored.

Here, the contact list number includes an NDD code of 1, which does not correspond to the OTA (e.g., China) NDD code and also does not correspond to the U.K. NDD code. Therefore, when the reference country is the U.K. or China, the device dials the number as is since the formatting of the stored number does not correspond to the format specified in Section 2.3(A)(3) and to any of the formats specified in the remaining sections. When the reference country is the U.S., the device replaces the NDD code identified in the contact list number with the OTA IDD code followed by the U.S. country code and dials the remaining numbers as stored. This is because the device determines that the NDD code 1 is the same as the U.S. NDD code, the U.S. country code is not the same as the OTA country code, and the number of digits in the contact list number equals the U.S. national number length plus the number of digits in the U.S. NDD code.

In another example, the U.S. number may be stored without the U.S. NDD code (e.g., 9081234567). As pointed out above in Section 2.3(A)(4), when the number of digits in the contact list number equals the reference country national number length and the reference country code is not the same as the OTA country code, the device dials the OTA IDD code followed by the reference country code and the contact list number. When the U.S. is the reference country, the device determines whether the number of digits in the contact list number equals the U.S. national number length and whether the U.S. country code is the same as the OTA country code. Here, the device determines that the number of digits in the contact list number equals the U.S. national number length and the U.S. country code is not the same as the OTA country code. Therefore, according to the format specified in Section 2.3(A)(4), the device dials the OTA IDD code followed by the U.S. country code and the contact list number.

Similarly, when the U.K. is the reference country, the device determines whether the number of digits in the contact list number equals the U.K. national number length and whether the U.K. country code is the same as the OTA country code. Here, the device determines that the number of digits in the contact list number equals the U.K. national number length and that the U.K. country code is not the same as the OTA country code. Therefore, according to the format specified in Section 2.3(A)(4), the device dials the OTA IDD code followed by the U.K. country code and the contact list number. When China is the reference country, the device determines whether the number of digits in the contact list number equals the China national number length and whether the China country code is the same as the OTA country code. Here, the device determines that the number of digits in the contact list number equals the China national number length and that the China country code is the same as the OTA (e.g., China) country code. Therefore, the device dials the number without modification. That is, the number is not dialed properly and the reference country should be changed to, for example, the U.S. for correct dialing.

In yet another example, the U.S. number may be stored without the U.S. NDD code and the area code (e.g., 1234567). As noted above with respect to Section 2.3(A)(5), when the number of digits in the contact list number equals the reference country national number length minus the number of digits in the reference country area/city code and the reference country code is not the same as the OTA country code, the device dials the OTA IDD code followed by the reference country code, the reference country area/city code, and the contact list number.

When the U.S. is the reference country, the mobile device determines whether the number of digits in the contact list number equals the U.S. country national number length minus the number of digits in the U.S. country area/city code and whether the U.S. country code is the same as the OTA country code. Here, since the number of digits in the contact list number equals the U.S. country national number length minus the number of digits in the U.S. country area/city code and the U.S. country code is not the same as the OTA country code, the device dials the OTA IDD code followed by the U.S. country code, the U.S. area/city code, and the contact list number.

When China is the reference country, the mobile device determines whether the number of digits in the contact list number equals the China country national number length minus the number of digits in the China country area/city code and whether the China country code is the same as the OTA country code. Here, since the number of digits in the contact list number does not equal the China country national number length minus the number of digits in the China country area/city code and/or the China country code is the same as the OTA country code, the device dials the number as is without further modification.

When the U.K. is the reference country, the mobile device again determines whether the number of digits in the contact list number equals the U.K. country national number length minus the number of digits in the U.K. country area/city code and whether the U.K. country code is the same as the OTA country code. Here, since the number of digits in the contact list number does not equal the U.K. country national number length minus the number of digits in the U.K. country area/city code, the device dials the number as is without further modification.

In table 1300B, the Chinese number is 861030123456, where 86 is the China country code, 10 is the China area code, and 30123456 is the number. As shown, in table 1300B, the number is stored with various formats. One format includes '+' followed by the Chinese number (e.g., +861030123456). In this scenario, the mobile device determines if the contact list number is a local number. To this end, the mobile device determines whether the numbers following '+' correspond to the OTA country code. As noted above, in Section 2.3(A)(1), if the numbers following '+' correspond to the OTA country code, the device replaces '+' and the country code with the OTA NDD code and dials the number as OTA NDD code followed by the remaining numbers in the contact list number. If, however, the numbers following '+' do not correspond to the OTA country code, the device replaces '+' with the OTA IDD code and dials the number as OTA IDD code followed by the remaining numbers in the contact list number. Here, the numbers following '+' match the OTA country code. Therefore, the device replaces '+' and the country code with the OTA NDD code and dials the remaining numbers as stored in accordance with format specified in Section 2.3(A)(1)(A).

Another format includes the U.S. IDD code followed by the Chinese number (e.g., 011861030123456). As noted above with respect to Section 2.3(A)(2), when the contact list number includes a reference country IDD code or an OTA country IDD code followed by a country code, an area/city code, a phone number, the device determines if the contact list number is a local number. To do so, similar to the method shown in Section 2.3(A)(1), the device determines whether the numbers following the IDD code correspond to the OTA country code. Based on the result of this determination, the device may take one of the following actions: (A) if the numbers after the IDD code correspond to the OTA country code, the device replaces the IDD code and the country code with the OTA NDD code and dials the OTA NDD code followed by remaining numbers in the contact list number; and (B) if the numbers after the IDD code do not correspond to the OTA country code, the device takes the following actions depending on whether the IDD code corresponds to the reference country or to the OTA country: (i) if the IDD code is the reference country IDD code, the device replaces the IDD code with the OTA IDD code and dials the OTA IDD code followed by the remaining numbers in the contact list number; and (ii) if the IDD code is the OTA IDD code, the device dials the contact list number as is with no modification.

When the U.S. is the reference country, the device determines whether the IDD code corresponds to one of the U.S. IDD code or the OTA IDD code. Since the IDD code matches one of the U.S. IDD code or the OTA IDD code (e.g., it matches the U.S. IDD code), the device determines if the contact list number is a local number. To this end, the mobile device determines whether the numbers following the IDD code correspond to the OTA country code. Since the numbers following the IDD code do correspond to the OTA country code, the device uses the method of Section 2.3(A)(2)(A) to modify the contact list number. The device replaces the U.S. IDD code and the country code with the OTA NDD code and dials the OTA NDD code followed by remaining numbers in the contact list number.

When China is the reference country, the device determines whether the IDD code corresponds to the China IDD code (e.g., the reference country and the OTA country are the same in this scenario). Since the IDD code do not match the China IDD code, the device dials the number as stored. Similarly, when the U.K. is the reference country, the device determines whether the IDD code corresponds to the U.K. IDD code or the OTA IDD code. Since the IDD code do not correspond to either, the device dials the number as stored. For each of these scenarios, the reference country in the mobile device should be changed to, for example, the U.S. for correct dialing.

Another format includes the U.K. IDD code followed by the Chinese number (e.g., 00861030123456). Similar to the previous format, since the number begins with the IDD code, the device determines whether it begins with the IDD code of the reference country or the OTA country. If neither, the number is dialed as stored. Here, the number begins with the U.K. IDD code '00' which is the same as that of OTA IDD code. Therefore, the device determines whether the numbers following the U.K. IDD code correspond to the OTA country code. Since in this scenario, the numbers following the U.K. IDD code correspond to the OTA country code, the device replaces the IDD code and the country code with the OTA NDD code and dials the remaining numbers as stored regardless of the reference country choice.

Another format includes the Chinese number without the country code but with the China NDD (e.g., 01030123456). As noted above in Section 2.3(A)(3), when the contact list number includes an NDD code, an area/code, and a phone number, the device takes one of the following actions: (A) when the contact list number begins with either a reference country NDD code or an OTA NDD code, a country code of the reference country is the same as the OTA country code, and number of digits in the contact list number equals the reference country national number length plus the number of digits in the reference country NDD code, the device dials the contact list number as is without modification; and (B) when the contact list number includes the reference country NDD code or the OTA NDD code, the reference country code is not the same as the OTA country code, and number of digits in the contact list number equals the reference country national number length plus the number of digits in the reference country NDD code, the device replaces the NDD code identified in the contact list number with the OTA IDD code followed by the country code of the reference country and dials the remaining numbers as stored.

Here, when the U.S. is the reference country, the device dials the number according to the format specified in Section 2.3(A)(3)(B). This is due to the device's determination that the contact list number includes the OTA NDD code, the U.S. county code is not the same as the OTA country code, and number of digits in the contact list number equals the U.S. national number length plus the number of digits in the U.S. NDD code. When China is the reference country, the device dials the number according to the format specified in Section 2.3(A)(3)(A). This is due to the device's determination that the contact list number begins with the OTA NDD code, the China country code is the same as the OTA country code, and number of digits in the contact list number equals the China national number length plus number of digits in the China NDD code. When the U.K. is the reference country, the device dials the number according to the format specified in Section 2.3(A)(3)(B). This is due to the device's determination that the contact list number begins with the OTA NDD code, the U.K. country code is not the same as the OTA country code, and number of digits in the contact list number equals the U.K. country national number length plus the number of digits in the U.K. NDD code.

In table 1300C, the U.K. number is 44987654321, where 44 is the U.K. country code, 9876 is the U.K. area code, and 543211 is the number. As shown, in table 1300C, the number is stored with various formats. One format includes '+' followed by the U.K. number (e.g., +449876543211). In this scenario, the mobile device determines if the contact list number is a local number. To this end, the mobile device determines whether the numbers following '+' correspond to the OTA country code. As noted above, in Section 2.3(A)(1), if the numbers following '+' correspond to the OTA country code, the device replaces '+' and the country code with the OTA NDD code and dials the number as OTA NDD code followed by the remaining numbers in the contact list number. If, however, the numbers following '+' do not correspond to the OTA country code, the device replaces '+' with the OTA IDD code and dials the number as OTA IDD code followed by the remaining numbers in the contact list number. Here, the numbers following '+' do not correspond to the OTA country code. Therefore, the device replaces '+' with the OTA IDD code and dials the remaining numbers as entered. The device takes this action regardless of the reference country.

Another format includes the U.S. IDD code followed by the U.K. number (e.g., 011449876543211). As noted above with respect to Section 2.3(A)(2), when the contact list number includes a reference country IDD code or an OTA country IDD code followed by a country code, an area/city code, a phone number, the device determines if the contact list number is a local number. To do so, similar to the method shown in Section 2.3(A)(1), the device determines whether the numbers following the IDD code correspond to the OTA country code. Based on the result of this determination, the device may take one of the following actions: (A) if the numbers after the IDD code correspond to the OTA country code, the device replaces the IDD code and the country code with the OTA NDD code and dials the OTA NDD code followed by remaining numbers in the contact list number; and (B) if the numbers after the IDD code do not correspond to the OTA country code, the device takes the following actions depending on whether the IDD code corresponds to the reference country or to the OTA country: (i) if the IDD code is the reference country IDD code, the device replaces the IDD code with the OTA IDD code and dials the OTA IDD code followed by the remaining numbers in the contact list number; and (ii) if the IDD code is the OTA IDD code, the device dials the contact list number as is with no modification.

When the U.S. is the reference country, the device determines whether the IDD code corresponds to one of the U.S. IDD code or the OTA IDD code. Since the IDD code matches one of the U.S. IDD code or the OTA IDD code (e.g., it matches the U.S. IDD code), the device determines if the contact list number is a local number. To this end, the mobile device determines whether the numbers following the IDD code correspond to the OTA country code. Since the numbers following the IDD code do not correspond to the OTA country code, the device uses the method of Section 2.3(A)(2)(B) to modify/dial the contact list number. The device determines whether the IDD code matches the U.S. IDD code or the OTA IDD code. Here, as noted above, the IDD code matches the U.S. IDD code. Therefore, the device replaces the U.S. IDD code with the OTA IDD code and dials the OTA IDD code followed by the remaining numbers in the contact list number.

When China is the reference country, the device determines whether the IDD code corresponds to the China IDD code (e.g., the reference country and the OTA country are the same in this scenario). Since the IDD code do not match the China IDD code, the device dials the number as stored. Similarly, when the U.K. is the reference country, the device determines whether the IDD code corresponds to the U.K. IDD code or the OTA IDD code. Since the IDD code do not correspond to either, the device dials the number as stored. For each of these scenarios, the reference country in the mobile device should be changed to, for example, the U.S. for correct dialing.

Another format includes the China IDD code followed by the U.K. number (e.g., 00449876543211). Similar to the previous format, since the number begins with the IDD code, the device determines whether it begins with the IDD code of the reference country or the OTA country. If neither, the number is dialed as stored. Here, the number begins with the China IDD code '00,' which is the same as that of OTA IDD code. The device determines whether the numbers following the China IDD code correspond to the OTA country code. Since in this scenario, the numbers following the China IDD code do not correspond to the OTA country code, the device modifies/dials the number according to the format specified in Section 2.3(A)(2)(B). To this end, the device determines whether the IDD code of the contact list number matches the reference country IDD code or the OTA IDD code. Here, the IDD code matches the OTA IDD code. Upon determining that the IDD code matches the OTA IDD code, the device dials the number as is without modification.

Another format includes the U.K. number without the country code but with the U.K. NDD (e.g., 09876543211). As noted above with respect to Section 2.3(A)(3), when the contact list number includes an NDD code, an area/code, and a phone number, the devices takes one of the following actions: (A) when the contact list number begins with either a reference country NDD code or an OTA NDD code, a country code of the reference country is the same as the OTA country code, and number of digits in the contact list number equals the reference country national number length plus number of digits in the reference country NDD code, the device dials the contact list number as is without modification; and (B) when the contact list number includes the reference country NDD code or the OTA NDD code, the reference country code is not the same as the OTA country code, and number of digits in the contact list number equals the reference country national number length plus the number of digits in the reference country NDD code, the device replaces the NDD code identified in the contact list number with the OTA IDD code followed by the country code of the reference country and dials the remaining numbers as stored.

In the event, that the reference country is set to the U.S. or China the device will not dial correctly. When the device's reference country is set to the U.S., the device first checks to see if the number begins with the reference country IDD code or the OTA IDD code. In this case, the number 0987654321 does not begin with either (e.g., the U.S. IDD code is 011 and the OTA IDD code is 00). The device then checks if the number begins with either the U.S. NDD code or the OTA NDD code, checks if the U.S. country code matches the OTA country code, and checks if the number of digits in the contact list number equals the U.S. country national number length plus number of digits in the U.S. NDD code. In this case, the number 098764321 begins with the OTA NDD code, the U.S. country code does not match the OTA country code, and the total number of digits in the number is 11, which is the same as the U.S. national number length (e.g., 10) plus the number of digits in US NDD code (e.g., 1). As a result, the device interprets this to be a number in the U.S. and dials 001987654211 (e.g., replaces the NDD code with the OTA IDD code and the U.S. country code)

When the device's reference country is set to China, the device once again checks to see if the number begins with the China country IDD code or the OTA IDD code. In this case, the number 0987654321 does not begin with either. The device then checks if the number begins with either the China NDD code or the OTA NDD code, checks if the China country code matches the OTA country code, and that the number of digits in contact list number equals the China country national number length plus number of digits in the China NDD code. In this case, the number does begin with the OTA NDD code, the Chin country code matches the OTA country code and the total number of digits in the number is 11, which is the same as China national number length (e.g., 10) plus the number of digits in China NDD code (e.g., 1). As a result, the device interprets this to be a local number in China and dials 09876543211.

When the device's reference country is set to the U.K., the device once again checks to see if the number begins with the U.K. country IDD code or the OTA IDD code. In this case, the number 0987654321 does not begin with either. The device then checks if the number begins with either the U.K. NDD code or the OTA NDD code, checks if the U.K. country code matches the OTA country code, and that the number of digits in the contact list number equals the U.K. country national number length plus number of digits in the U.K. NDD code. In this case, the number begins with the U.K. NDD code or the OTA NDD code, the U.K. country code does not match the OTA country code and the total number of digits in the number is 11, which is the same as the U.K. national number length (e.g., 10) plus the number of digits in U.K. NDD code (e.g., 1). As a result, the device interprets this to be a number in UK and dials 00449876543211.

To appreciate the application of the above-discussed algorithm, it may be helpful to consider the context of an exemplary system of networks as well as the hardware and software of an exemplary mobile station device, as may be involved in implementing assisted dialing along the lines taught by the examples discussed above. An exemplary network is described with respect to FIG. 14, and a mobile station will be discussed later with regard to FIG. 15.

Figure 14:
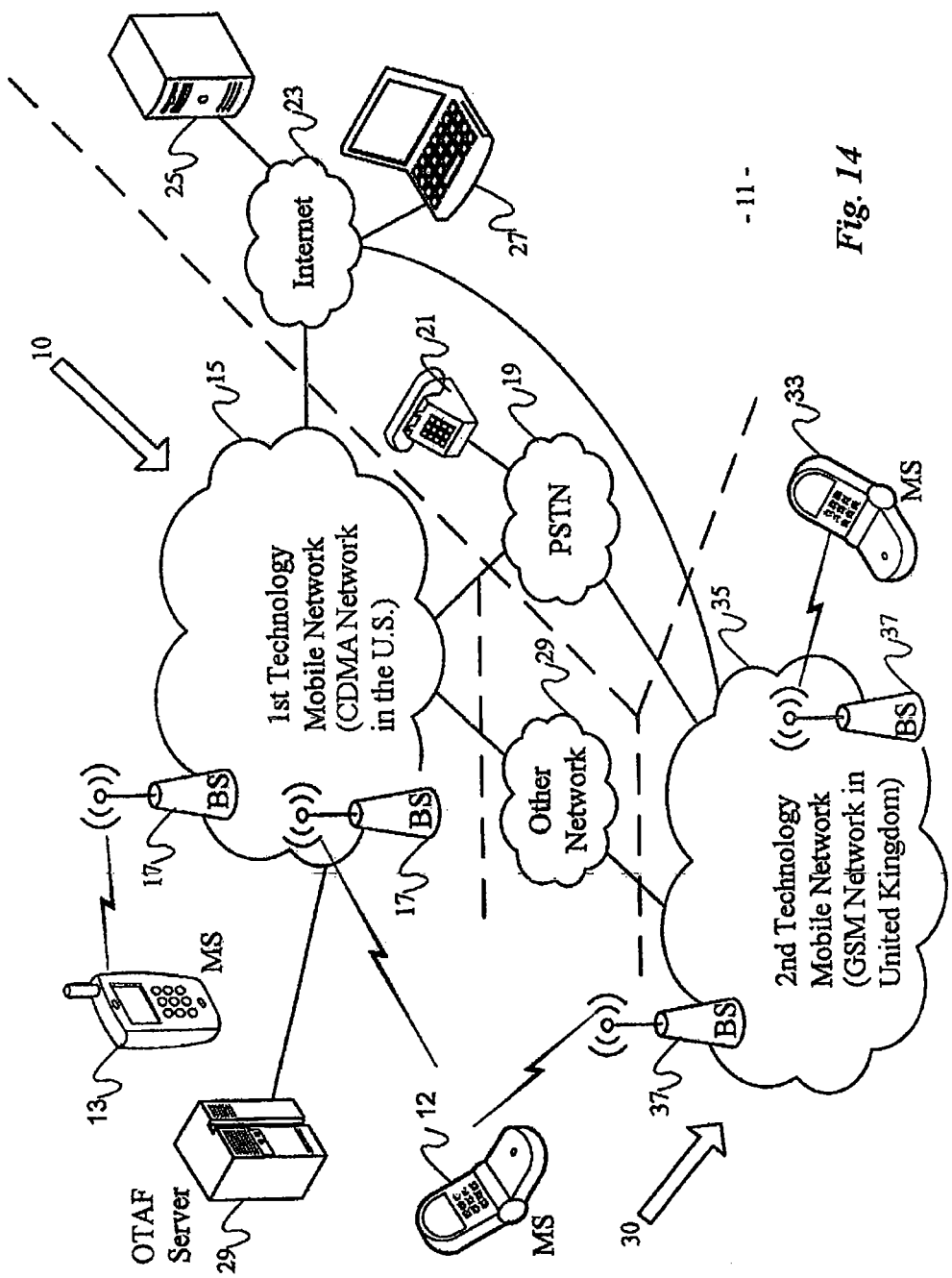
FIG. 14 is a functional block diagram of an exemplary system of wireless networks for providing mobile voice telephone services and various data services, useful in explaining a context in which assisted dialing may be desirable.

FIG. 14 is a functional block diagram of an exemplary system of wireless networks for providing mobile voice telephone services and various data services. For discussion purposes, the diagram shows two wireless networks 10 and 30 operated in accord with different technology standards. The networks 10 and 30 often (but not always) may be operated by different providers, carriers or operators. The communication networks 10 and 30 implementing the illustrated system provide mobile voice telephone communications as well as other services such as text messaging and various multimedia packet data services, for numerous mobile stations. For purposes of later discussion three mobile stations 12, 13 and 33 appear in the drawing. The elements indicated by the reference numerals 10 and 30 generally are elements of the respective operator's network, although the mobile stations 12, 13 and 33 typically are sold to the carrier's customers. Today, mobile stations typically take the form portable handsets, smart-phones or personal digital assistants, data cards for computers, although they may be implemented in other form factors. Each mobile communication network 10 or 30 provides communications between mobile stations 12, 13 and 33 as well as communications for the mobile stations with other networks and stations shown generally at 11 outside the mobile communication networks. An inter-carrier or other intermediate network 29 may provide communication connectivity between the mobile communication networks 10 and 30.

Each network 10 and 30 allows users of the mobile stations operating through the respective network to initiate and receive telephone calls to each other as well as through the public switched telephone network (PSTN) 19 and telephone stations 21 connected thereto. One or both of the networks typically offers a variety of text and other data services, including services via the Internet 23, such as downloads, web browsing, e-mail, etc. via servers shown generally at 25 as well as message communications with terminal devices represented generally by the personal computer 27.

The networks 10 and 30 are generally similar, except in our example, they offer respective services via two different wireless communication technologies. For purposes of an example for discussion here, we will assume that the network 10 is a 3GPP2 (1×RTT and EVDO) technology network, whereas the network 30 is a 3GPP (LTE/GSM/UMTS) technology network. In one implementation, the networks 10, 30 are operated in one country. In another example, the networks 10, 30 are operated in different countries. In keeping with the previous examples, the network 10 may be operated in the reference country and the network 30 may be operated outside the reference country.

The mobile communication network 10 typically is implemented by a number of interconnected networks. Hence, the overall network 10 may include a number of radio access networks (RANs), as well as regional ground networks interconnecting a number of RANs and a wide area network (WAN) interconnecting the regional ground networks to core network elements. A regional portion of the network 10, such as that serving mobile station 13 will typically include one or more RANs and a regional circuit and/or packet switched network and associated signaling network facilities.

Physical elements of a RAN operated by one of the mobile service providers or carriers, include a number of base stations represented in the example by the base stations (BSs) 17. Although not separately shown, such a base station 17 typically comprises a base transceiver system (BTS) which communicates via an antennae system at the site of base station and over the airlink with one or more of the mobile stations 13, when the mobile stations are within range. The BTS is the part of the radio network that sends and receives RF signals to/from the mobile stations that the base station currently serves. Hence, in our example, the BTS would utilize 3GPP2 (1×RTT and EVDO) type transceiver equipment and implement communications in accord with the protocols of the applicable 3GPP2 standard, for signaling, registration, voice communication, data communication, etc. For example, each base station 17 will broadcast certain standardized information to allow a mobile station 12 or 13 in the region to search for, find and lock-onto the base station 17 and acquire information needed to register and initiate communications via the network 10, all in accord with the standard 3GPP2 protocols.

The radio access networks also include a traffic network represented generally by the cloud at 15, which carries the user communications for the mobile stations 12, 13 between the base stations 17 and other elements with or through which the mobile stations communicate. Individual elements such as switches and/or routers forming the traffic network 15 are omitted here for simplicity. Although not separately shown, the network 15 will include or connect with a number of service control elements, for authenticating mobile stations to use the network 10, for authenticating mobile device users and/or for authorizing users or devices to access various services and service features offered by the particular network 10, and for usage accounting and billing functions.

The traffic network portion 15 of the mobile communication network 10 connects to a public switched telephone network 19. This allows the network 10 to provide voice grade call connections between mobile stations and regular telephones connected to the PSTN 19. The drawing shows one such telephone at 21. The traffic network portion 15 of the mobile communication network 10 also connects to a public packet switched data communication network, such as the network commonly referred to as the "Internet" shown at 23.

Packet switched communications via the traffic network 15 and the Internet 23 may support a variety of user services through the network 10, such as mobile station communications of text and multimedia messages, e-mail, web surfing or browsing, programming and media downloading, etc. For example, the mobile stations may be able to receive messages from and send messages to user terminal devices, such as personal computers, either directly (peer-to-peer) or via various servers 25. The drawing shows one user terminal device as a personal computer (PC) at 27, by way of example.

The carrier or service provider that operates the network 10 will also operate a number of systems that provide ancillary functions in support of the communications services provided through the network 10, and those elements communicate with other nodes/elements of the network 10 via one or more private IP type packet data networks or Intranets (not separately shown). Such systems maintain various records used for authentication and authorization functions and provisioning necessary information into the mobile stations to enable they operation via the network 10. Of note for purposes of the present discussion, one or more such systems provide the capability to download the assisted dialing program into the mobile stations of the network operator, in this example, via the networks. An example of such a system that may facilitate programming and/or downloading via the networks is the Over-The-Air service activation/provisioning Function (OTAF) 28. In the example, the OTAF 28 may be a server connected to the traffic network 15, to enable the server to communicate with the mobile stations of the network operator's customer and configure it for assisted dialing.

As noted earlier, many mobile wireless communications networks have been deployed and are available today. For purposes of discussion the example of FIG. 14 shows a second mobile network 30. In our example, the network 30 is operated by a different carrier or service provider than the operator of network 10. In some areas, the second network 30 could utilize the same wireless technology as the network 10, but in our example, the network 30 utilizes a different wireless network technology. The network 10 is a 3GPP2 (1×RTT and EVDO) technology network, and in the example, the network 30 is a 3GPP (LTE/GSM/UMTS) technology network.

Like the network 10, the physical elements of the radio access network (RAN) 30 include a number of base stations (BSs) 37, each of which includes a base transceiver system (BTS) and associated antenna system. In our example, each BTS of a base station 37 would utilize 3GPP (LTE/GSM/UMTS) type transceiver equipment and implement communications in accord with the protocols of the applicable 3GPP standard, for signaling, registration, voice communication, data communication, etc. For example, each base station 37 will broadcast certain standardized information to allow a mobile station 12 or 33 in the region to search for, find and lock-onto the base station 37 and acquire information needed to register and initiate communications via the network 30, all in accord with the standard 3GPP protocols.

The radio access network portions of network 30 also include a traffic network represented generally by the cloud at 35, which carries the user communications for the mobile stations 12, 33 between the base stations 37 and other elements with or through which the mobile stations communicate. Individual elements such as switches and/or routers forming the traffic network 35 are omitted here for simplicity. Although not separately shown, the network 35 will include or connect with a number of service control elements, for authenticating mobile stations to use the network 30, for authenticating mobile device users and/or for authorizing users or devices to access various services and service features offered by the particular network 30.

Similar to network 10, the traffic network portion 35 of the mobile communication network 30 connects to a public switched telephone network 19, to offer voice grade telephone call connections between mobile stations and regular telephones 21 connected to the PSTN 19. The traffic network portion 35 of the mobile communication network 30 also connects to a public packet switched data communication network, such as the network commonly referred to as the "Internet" shown at 23, for various mobile station communications with servers 25 and/or user terminal devices 27. Although omitted for simplicity, the network 30 may also include various systems that provide ancillary functions in support of the communications services provided through the network 30, such as a system similar to the OTAF 29 for providing data and/or programming downloads to the mobile stations of the network operator's customers.

The mobile devices 12, 13, and 33 are configured to perform assisted dialing regardless of which network they are receiving service from. To this end and as noted above with respect to FIGS. 1-13, any of the mobile devices 12, 13, and 33 is configured to perform an assisted dialing process. The process begins with the mobile devices receiving a number. The mobile device automatically identifies a reference country and one or more parameters associated with the reference country. The reference country may include a country associated with the home network of the mobile device. For example, for mobile device 13, the reference country is the United States and the home network is the CDMA network; whereas for mobile device 33, the reference country may be United Kingdom and the home network may be a GSM network.

The one or more parameters associated with the reference country may include country code, NDD code, area/city code, and national number length. Based on the one or more parameters associated with the reference country, the mobile device automatically determines whether the received number should be modified. Determining whether the mobile number should be modified may include determining whether the mobile device is operating in the reference country and whether the received number is local to the reference country.

The location of the mobile device may be identified via a GPS or from a signature of the wireless network currently servicing the mobile device. To determine the destination of the number (e.g., local or international), a number of techniques may be used as described above with respect to FIG. 1. For example, the mobile device may distinguish the local numbers from the international ones by comparing the total number of digits in the received number with the national number length of the reference country. Other techniques may be used that have been described in the instant application and will not be described here for sake of brevity.

Based on the country of operation and the origin of the received number, the mobile device may determine whether to modify the received number or to not modify the received number using assisted dialing option. For example, if mobile device 13 which is operating in the United States receives number 1-908-555-1212 which may be the MDN of mobile device 12, the mobile device 13 does not modify the number. This is because the mobile device 13 is operating in the United States and the received number is indeed a local number. However, if the mobile device 13 receives a number 449876543211 which may be the MDN of mobile device 33, the mobile device may modify the number to include 011 because the number is an international number.

In another scenario, the mobile device may determine that it is not operating in the reference country while the received number is associated with the reference country. In this scenario, the mobile device identifies an IDD code of the country in which the mobile device is located and automatically modifies the received number to include the IDD code of the country in which it is operating in. For example, assume mobile device 13 moves to the United Kingdom GSM network 35 and receives number 011-1-908-555-1212, the mobile device recognizes that the number is an international number and replaces the IDD code with '+' sign. Therefore, the mobile device dials +-1-908-555-1212.

In yet another scenario, the mobile device may determine that the country of operation is indeed the reference country but the received number is not associated with the reference country (e.g., an international number). In this scenario, the mobile device automatically modifies the received number (if necessary) and transmits the modified number to the wireless network of the modified number (150, 160). For example, while operating in the reference country (e.g., the United States), the mobile device 13 may receive number 44987654321 associated with mobile device 33. The number includes the same number of digits as the national number length of the United States. However, since the number does not begin with the country code of the NDD code of the United States (e.g., '1'), the mobile device 13 assumes the number is international and modifies the number to include the IDD code of the United States. As such, the mobile device dials 01144987654321.

Figure 15:
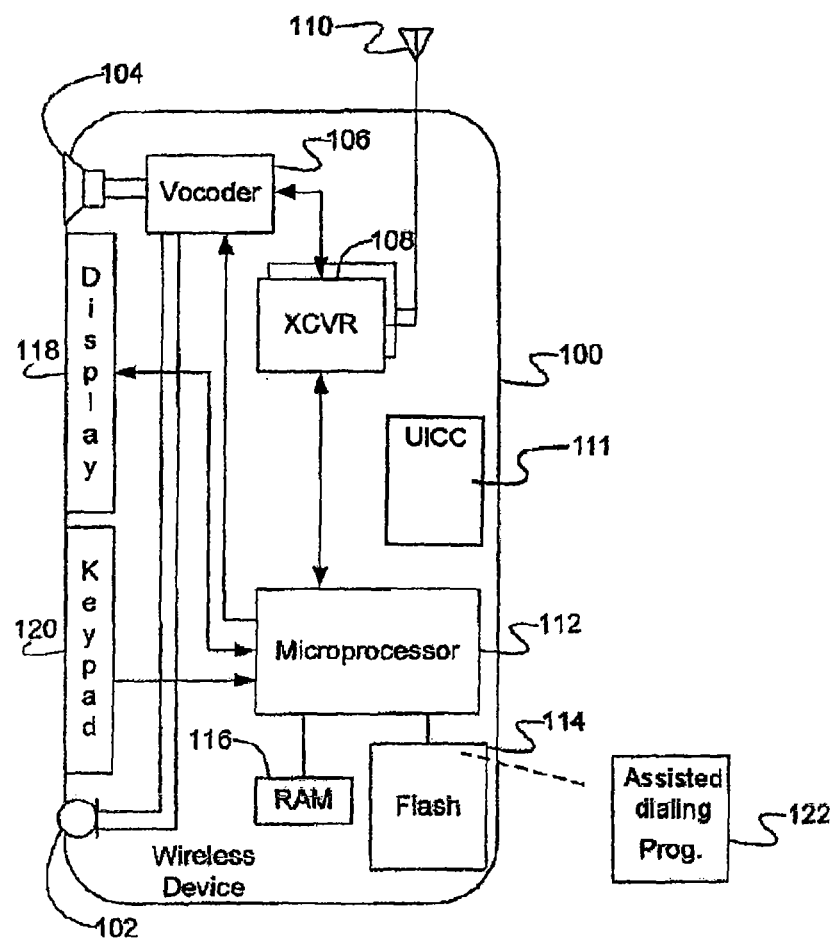
FIG. 15 provides a block diagram illustration of an exemplary wireless device capable of implementing assisted dialing using one or more of the exemplary techniques discussed herein.

FIG. 15 provides a block diagram illustration of an exemplary wireless device 100, which may be the wireless device 12, 13 or 33 of a customer of any of the network operators. Although the wireless device 100 may be a smart-phone or may be incorporated into another device, such as a portable personal computer, personal digital assistant (PDA) or the like, for discussion purposes, the illustration shows the wireless device 100 in the form of a handset. The handset embodiment of the wireless device 100 functions as a normal digital wireless telephone station. For that function, the station 100 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the handset 100 also includes at least one digital transceiver (XCVR) 108. The handset 100 is a multimode device capable of operations on various technology type networks, such as the networks 10 and 30. For example, the handset 100 may utilize either or both of 3GPP2 (1×RTT and EVDO) technologies and 3GPP (LTE/GSM/UMTS) technologies. For that purpose, the transceiver (XCVR) 108 could be a multimode transceiver, or the handset 100 may include two or more transceivers each of which supports a subset of the various technologies or modes. The concepts discussed here encompass embodiments of the station 100 utilizing any digital transceivers that conform to current or future developed digital wireless communication standards.

The transceiver 108 provides two-way wireless communication of information, such as vocoded speech samples and/or digital message information, in a selected one of the technology modes. The transceiver 108 also sends and receives a variety of signaling messages in support of the various voice and data services provided via the station 100 and the communication network (described earlier with regard to FIG. 14). Each transceiver 108 connects through RF send and receive amplifiers (not separately shown) to an antenna 110. In the example, the transceiver 108 is configured for RF communication in accord with a digital wireless protocol, such as the current 3GPP2 and 3GPP protocols.

The station 100 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. In addition to normal telephone and data communication related input/output, these elements also may be used for display of menus and other information to the user and user input of selections, if needed during a system selection operation or during a selection software download operation. Various combinations of the keypad 120, display 118, microphone 102 and speaker 104 may be used as the physical input output elements of the GUI, for multimedia (e.g. audio and/or video) communications. Of course other user interface elements may be used, such as a stylus and touch sensitive display screen, as in a PDA or smart phone.

A microprocessor 112 serves as a programmable controller for the wireless device 100, in that it controls all operations of the wireless device 100 in accord with programming that it executes, for all normal operations, and for operations involved in selecting a preferred technology and selecting an available network of the appropriate technology type, for mobile communications. In the example, the wireless device 100 includes flash type program memory 114, for storage of various "software" or "firmware" program routines and mobile configuration settings, such as mobile directory number (MDN) and/or mobile identification number (MIN), etc. The wireless device 100 may also include a non-volatile random access memory (RAM) 116 for a working data processing memory. Of course, other storage devices or configurations may be added to or substituted for those in the example. In a present implementation, the flash type program memory 114 stores firmware such as a boot routine, device driver software, an operating system, call processing software and vocoder control software, and any of a wide variety of other applications, such as client browser software and short message service software. The memories 114, 116 also store various data, such as telephone numbers and server addresses, downloaded data such as multimedia content, and various data input by the user. Programming for the mobile station 100, including the assisted dialing programming 122, is stored in the flash type program memory 114. The programming is sometimes referred to as "firmware," is loaded into and executed by the microprocessor 112.

The executable assisted dialing programming 122 stored in the flash memory 114 may include a program for enabling the mobile device 100 to select a proper international standard for dialing numbers both domestically and internationally. 3GPP variants of the mobile devices often utilize a UICC 111, which provides secure storage for various data needed for operation of a mobile device, such as data identifying the mobile device to the network (e.g. MDN and/or MIN). The UICC is a standardized removable module that can be moved from one mobile device to another, to effectively move the mobile device identity from one device to another. In one implementation, the assisted dialing program 122 may be stored in the UICC 111 instead of the flash memory 114.

As shown by the above discussion, assisted dialing functions may be implemented on a mobile device in a form programming. An example of the device has been discussed above relative to FIG. 15. The relevant software (programming and/or list data) may be downloaded and/or updated from a computer platform, for example, from an OTAF server or the like communicating with the mobile device via the network. Although special purpose devices may be used to support the download and update functions, such devices also may be implemented using one or more hardware platforms intended to represent a general class of data processing device commonly used to run "server" and/or "client" programming so as to implement the functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data for assisted dialing. The programming code 122 for assisted dialing is executable by the microprocessor 112 of the mobile device 100, e.g. from storage in the flash memory 114 or from the UICC 111. For downloading and installation, however, the software is stored within the general-purpose computer platform or the like serving as the OTAF system 29.

FIGS. 16 and 17 provide functional block diagram illustrations of general purpose computer hardware platforms. FIG. 15 illustrates a network or host computer platform, as may typically be used to implement a server. FIG. 15 depicts a computer with user interface elements, as may be used to implement a personal computer or other type of work station or terminal device, although the computer of FIG. 15 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

Hence, aspects of the methods of assisted dialing outlined above may be embodied in programming. Program aspects of the technology may be thought of as "products" or "articles of manufacture" typically in the form of executable code and/or associated list data that is carried on or embodied in a type of machine readable medium. "Storage" type media include any or all of the memory of the mobile stations, computers, processors or the like, or associated modules thereof, such as various semiconductor memories, tape drives, disk drives and the like, which may provide storage at any time for the software programming. All or portions of the software may at times be communicated through the Internet or various other telecommunication networks. Such communications, for example, may enable loading of the software from a computer or processor into the mobile station, for example, from the OTAF server or other computer of the network operator into the mobile station(s) of the operator's customer(s). Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or a physical transmission medium. Non-volatile storage media include, for example, semiconductor memories of mobile stations, or optical or magnetic disks, such as any of the storage devices in any computer(s) or the like, such as may be used to implement the assisted dialing techniques shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions and/or associated list data to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A method for enabling an assisted dialing on a mobile device, the method comprising steps of:
    receiving, at a mobile device, a destination telephone number for a communication to be initiated from the mobile device;
    identifying a reference country the reference country being a home country for operations of the mobile device;
    identifying an operation country, different from the reference country, as a country in which the mobile device is operating;
    for the communication to be initiated while the mobile device is operating in the operation country:
    (a) automatically determining that the received destination telephone number should be modified when a prefix number, including at least a plurality of numeric digits, of the destination telephone number does not match a corresponding prefix number, including at least another plurality of numeric digits, associated with the operation country;
    (b) automatically modifying the received destination telephone number, by directly replacing the prefix number of the destination telephone number, associated with the reference country, with the corresponding prefix number associated with the operation country, based on a mismatch of the prefix numbers; and
    (c) transmitting the modified destination telephone number to a wireless network servicing the mobile device.

2. The method of claim 1, further comprising activating an assisted dialing option including:
    displaying to the user of the mobile device the assisted dialing option;
    requesting the user of the mobile device to select the assisted dialing option;
    receiving from the user of the mobile device an indication that the user has selected the assisted dialing option; and
    enabling the assisted dialing on the mobile device in response to receiving the indication.

3. The method of claim 1, wherein the modified destination telephone number is associated with a text message or a voice call.

4. The method of claim 1, wherein receiving the destination telephone number includes receiving a telephone number from a contact list stored in the mobile device.

5. The method of claim 1, wherein identifying the operation country of the mobile device comprises identifying a location of the mobile device via a global positioning system (GPS).

6. The method of claim 1, wherein:
    the prefix includes an International Direct Dial (IDD) code of the reference country and the corresponding prefix includes an IDD code of the operation country.

7. The method of claim 1, wherein receiving the destination telephone number includes receiving the destination telephone number as directly input to the mobile device by the user.

8. The method of claim 1, further comprising:
    automatically activating an assisted dialing option; and
    displaying to the user that the assisted dialing is ON.

9. The method of claim 1, further comprising:
    notifying the user that the received destination telephone number is being modified by displaying, to the user, text indicating use of the assisted dialing; and
    displaying, to the user, the modified destination telephone number.

10. The method of claim 1, wherein identifying the reference country further includes:
    requesting that the user of the mobile device identify the reference country; and
    receiving, in response to the requesting step, a selection from the user identifying the reference country.

11. The method of claim 1, wherein when the received destination telephone number is modified, the majority of the modified destination telephone number is formed from the dialing digits of the received destination telephone number.

12. The method of claim 1, further comprising, for at least a further communication to be initiated while the mobile device is operating in the reference country, transmitting the received destination telephone number without any modification to a wireless network servicing the mobile device.

13. The method of claim 1, further comprising automatically activating the assisted dialing on the mobile device when the mobile device is operating in a country different than the reference country of the mobile device.

14. The method of claim 1, wherein the destination telephone number consists of numeric characters.

15. The method of claim 1, wherein identifying the operation country of the mobile device comprises identifying a location of the mobile device via a signature of the wireless network including a wireless technology used by the wireless network.

16. The method of claim 1, wherein identifying the operation country of the mobile device comprises identifying a location of the mobile device by a user input to an input element of the mobile device.

17. An article of manufacture comprising a machine-readable, non-transitory storage medium and a program for causing a mobile device to assist a user in making local or international calls, the program being embodied on the machine-readable, non-transitory storage medium and including instructions that, when executed, cause the mobile device to:
receive, at the mobile device, a destination telephone number for a communication to be initiated from the mobile device;
identify a reference country, the reference country being a home country of operation for the mobile device;
identify an operation country, different from the reference country, as a country in which the mobile device is operating;
for the communication to be initiated while the mobile device is operating in the operation country:
(a) automatically determine that the received destination telephone number should be modified when a prefix number, including at least a plurality of numeric digits, of the destination telephone number does not match a corresponding prefix number, including at least another plurality of numeric digits, associated with the operation country;
(b) automatically modify the received destination telephone number, by directly replacing the prefix number of the destination number, associated with the reference country, with the corresponding prefix number associated with the operation country, based on a mismatch of the prefix numbers; and
(c) transmit the modified destination telephone number to a wireless network servicing the mobile device.

18. The article of manufacture of claim 17, wherein the mobile device receives the destination telephone number from a contact list stored in the mobile device or from an idle mode.

19. The article of manufacture of claim 17, wherein:
the prefix includes an International Direct Dial (IDD) code of the reference country and the corresponding prefix includes an IDD code of the operation country.

20. A mobile device configured to perform assisted dialing operation, the mobile device comprising:
a processing device; and
a memory storing executable instructions for causing the processing device to:
receive, at the mobile device, a destination telephone number for a communication to be initiated from the mobile device;
identify a reference country, the reference country being a home country of operations for the mobile device;
identify an operation country, different from the reference country, as a country in which the mobile device is operating;
for the communication to be initiated while the mobile device is operating in the operation country:
(a) automatically determine that the received destination telephone number should be modified when a prefix number, including at least a plurality of numeric digits, of the destination telephone number does not match a corresponding prefix number, including at least another plurality of numeric digits, associated with the operation country;
(b) automatically modify the received destination telephone number, by directly replacing the prefix number of the destination number, associated with the reference country, with the corresponding prefix number, associated with the operation country, based on a mismatch of the prefix numbers; and
(c) transmit the modified destination telephone number to a wireless network servicing the mobile device.

21. the mobile device of claim 20, wherein the mobile device receives the destination telephone number from a contact list stored in the mobile device or from an idle mode.

22. The mobile device of claim 20, wherein:
the prefix includes an International Direct Dial (IDD) code of the reference country and the corresponding prefix includes an IDD code of the operation country.

23. A method comprising steps of:
receiving a destination telephone number comprising dialing digits at a mobile device for communications;
automatically determining whether a mobile device is roaming in a roaming country different from a home country of operations for the mobile device;
after determining that the mobile device is roaming:
(a) automatically determining that the received destination telephone number should be modified when a prefix number, including at least a plurality of numeric digits, of the destination telephone number does not match a corresponding prefix number, including at least another plurality of numeric digits, associated with the roaming country;
(b) automatically modifying the received destination telephone number, by directly replacing the prefix number of the destination number, associated with the home country, with the corresponding prefix number, associated with the roaming country, based on a mismatch of the prefix numbers; and
(c) transmitting the modified destination telephone number to a wireless network servicing the mobile device.

* * * * *